United States Patent
Wang et al.

(10) Patent No.: US 10,497,378 B2
(45) Date of Patent: *Dec. 3, 2019

(54) SYSTEMS AND METHODS FOR RECOGNIZING SOUND AND MUSIC SIGNALS IN HIGH NOISE AND DISTORTION

(71) Applicant: Shazam Investments Limited, London (GB)

(72) Inventors: Avery Li-Chun Wang, Palo Alto, CA (US); Julius O. Smith, III, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,955

(22) Filed: Jan. 23, 2018

(65) Prior Publication Data

US 2018/0374491 A1    Dec. 27, 2018

Related U.S. Application Data

(63) Continuation of application No. 15/213,969, filed on Jul. 19, 2016, now Pat. No. 9,899,030, which is a
(Continued)

(51) Int. Cl.
*G10L 19/018* (2013.01)
*G06F 16/632* (2019.01)
(Continued)

(52) U.S. Cl.
CPC .......... *G10L 19/018* (2013.01); *G06F 16/634* (2019.01); *G06F 16/683* (2019.01);
(Continued)

(58) Field of Classification Search
CPC .................................................. G10L 19/018
(Continued)

(56) References Cited

U.S. PATENT DOCUMENTS 4,415,767 A    11/1983   Gill et al.
4,450,531 A    5/1984    Kenyon et al.
(Continued)

FOREIGN PATENT DOCUMENTS

WO    WO 2001/004870    1/2001
WO    WO 2001/088900    11/2001
WO    WO 2002/01123     2/2007

OTHER PUBLICATIONS

Brown, et al., "Automatic Content-Based Retrieval of Broadcast News" In Proc. ACM Multimedia 95, San Francisco, Nov. 1995, 9 pages.
(Continued)

*Primary Examiner* — Susan I McFadden
(74) *Attorney, Agent, or Firm* — Blank Rome LLP

(57) ABSTRACT

A method for recognizing an audio sample locates an audio file that closely matches the audio sample from a database indexing a large set of original recordings. Each indexed audio file is represented in the database index by a set of landmark timepoints and associated fingerprints. Landmarks occur at reproducible locations within the file, while fingerprints represent features of the signal at or near the landmark timepoints. To perform recognition, landmarks and fingerprints are computed for the unknown sample and used to retrieve matching fingerprints from the database. For each file containing matching fingerprints, the landmarks are compared with landmarks of the sample at which the same fingerprints were computed. If a large number of corresponding landmarks are linearly related, i.e., if equivalent fingerprints of the sample and retrieved file have the same time evolution, then the file is identified with the sample.

18 Claims, 13 Drawing Sheets

Related U.S. Application Data continuation of application No. 14/252,433, filed on Apr. 14, 2014, which is a continuation of application No. 13/749,243, filed on Jan. 24, 2013, which is a continuation of application No. 13/460,079, filed on Apr. 30, 2012, which is a continuation of application No. 12/954,004, filed on Nov. 24, 2010, which is a continuation of application No. 12/048,825, filed on Mar. 14, 2008, which is a continuation of application No. 11/337,450, filed on Jan. 23, 2006, which is a continuation of application No. 09/839,476, filed on Apr. 20, 2001.

(60) Provisional application No. 60/222,023, filed on Jul. 31, 2000.

(51) Int. Cl.
*G06F 16/683* (2019.01)
*G10L 17/26* (2013.01)
*G11B 27/28* (2006.01)
*G10L 15/26* (2006.01)

(52) U.S. Cl.
CPC ............ *G10L 15/26* (2013.01); *G10L 17/26* (2013.01); *G11B 27/28* (2013.01)

(58) Field of Classification Search
USPC ........................................................ 704/270
See application file for complete search history.

(56) References Cited

U.S. PATENT DOCUMENTS

| | | | |
|---|---|---|---|
| 4,843,562 A | 6/1989 | Kenyon et al. | |
| 4,852,181 A | 7/1989 | Morito et al. | |
| 5,210,820 A | 5/1993 | Kenyon | |
| 5,276,629 A | 1/1994 | Reynolds | |
| 5,400,261 A | 3/1995 | Reynolds | |
| 5,627,915 A | 5/1997 | Rosser et al. | |
| 5,918,223 A | 6/1999 | Blum et al. | |
| 6,434,520 B1 | 8/2002 | Kanevsky et al. | |
| 6,453,252 B1 | 9/2002 | Laroche | |
| 6,570,080 B1 | 5/2003 | Hasegawa et al. | |
| 6,748,360 B2 | 6/2004 | Pitman et al. | |
| 6,834,308 B1 | 12/2004 | Ikezoye et al. | |
| 6,990,453 B2 | 1/2006 | Wang et al. | |
| 7,174,293 B2 | 2/2007 | Kenyon et al. | |
| 7,194,752 B1 | 3/2007 | Kenyon et al. | |
| 7,346,472 B1 | 3/2008 | Moskowitz et al. | |
| 7,346,512 B2 | 3/2008 | Wang et al. | |
| 7,359,889 B2 | 4/2008 | Wang et al. | |
| 7,627,477 B2 | 12/2009 | Wang et al. | |
| 7,660,700 B2 | 2/2010 | Moskowitz et al. | |
| 7,865,368 B2 | 1/2011 | Wang et al. | |
| 7,949,494 B2 | 5/2011 | Moskowitz et al. | |
| 8,090,579 B2 | 1/2012 | DeBusk et al. | |
| 8,190,435 B2 | 5/2012 | Wang et al. | |
| 8,214,175 B2 | 7/2012 | Moskowitz et al. | |
| 8,290,423 B2 | 10/2012 | Wang | |
| 8,386,258 B2 | 2/2013 | Wang et al. | |
| 8,428,955 B2 | 4/2013 | Olson | |
| 8,700,407 B2 | 4/2014 | Wang | |
| 9,390,170 B2 * | 7/2016 | Wang .................. | G06F 16/634 |
| 9,401,154 B2 * | 7/2016 | Wang .................. | G10L 17/26 |
| 2010/0145708 A1 | 6/2010 | Master et al. | |
| 2011/0071838 A1 | 3/2011 | Wang et al. | |
| 2012/0221131 A1 | 8/2012 | Wang et al. | |
| 2013/0138442 A1 | 5/2013 | Wang et al. | |
| 2016/0328473 A1 | 11/2016 | Wang et al. | |

OTHER PUBLICATIONS

Foote, "An Overview of Audio Information Retrieval", In ACM-Springer Multimedia Systems, vol. 7, No. 1, pp. 2-11 ACM Press/Springer-Vertag, Jan. 1999.

Foote, "Content-Based Retrieval of Music and Audio" Multimedia Storage and Archiving Systems II, Proc. of SPIE, Oct. 6, 1997, 3229, 138-147.

Liu, "Landmark Detection of Feature-Based Speech Recognition" J. Acoiust. Soc. Am., Nov. 1996, 100 (5), 3417-3430.

Manber, "Finding Similar Files in a Large File System" USENIX Winter 1994 Technical Conference Proceedings, San Francisco, California, Jan. 17-21, 1994, Oct. 1993, 11 pages.

Miller et al., "Audio Fingerprinting: Nearest Neighbor Search in High Dimensional Binary Spaces" IEEE Multimedia Signal Processing Workshop 2002, St. Thomas, US Virgin Islands, Dec. 9-11, 2002, 4 pages.

Wold et al., "Content-Based Classification, Search, and Retrieval of Audio" in IEEE Multimedia, Fall 1996, col. 3, No. 3: 27-36.

Yang, "Music Database Retrieval Based on Spectral Similarity" Stanford University Database Group Technical Report 2001-14, submitted Mar. 28, 2001 9 pages.

* cited by examiner

Index Sets

Sound_ID$_1$ $$\begin{bmatrix} (fingerprint_1, landmark_1) \\ (fingerprint_2, landmark_2) \\ \vdots \\ (fingerprint_m, landmark_m) \end{bmatrix}$$

$\cdots$

Sound_ID$_n$ $$\begin{bmatrix} (fingerprint_p, landmark_p) \\ (fingerprint_{p+1}, landmark_{p+1}) \\ \vdots \\ (fingerprint_t, landmark_t) \end{bmatrix}$$

FIG. 8A

Index List $$\begin{bmatrix} (fingerprint_1, landmark_1, sound\_ID_1) \\ (fingerprint_2, landmark_2, sound\_ID_1) \\ \vdots \\ (fingerprint_m, landmark_m, sound\_ID_1) \\ \vdots \\ (fingerprint_p, landmark_p, sound\_ID_n) \\ (fingerprint_{p+1}, landmark_{p+1}, sound\_ID_n) \\ \vdots \\ (fingerprint_t, landmark_t, sound\_ID_n) \end{bmatrix}$$

FIG. 8B

Candidate List $$\begin{bmatrix} (\text{landmark}_1, \text{landmark}^*_1, \text{sound\_ID}_1) \\ \vdots \\ (\text{landmark}_k, \text{landmark}^*_j, \text{sound\_ID}_j) \\ \vdots \\ (\text{landmark}_m, \text{landmark}^*_r, \text{sound\_ID}_n) \end{bmatrix}$$

*FIG. 9B*

Candidate Sound IDs $$\begin{bmatrix} \text{sound\_ID}_1 \\ \text{sound\_ID}_2 \\ \vdots \\ \text{sound\_ID}_n \end{bmatrix}$$

Scatter List $$\begin{bmatrix} (\text{landmark}_3, \text{landmark}^*_8) \\ \vdots \\ (\text{landmark}_k, \text{landmark}^*_j) \end{bmatrix}$$

*FIG. 9C*

SYSTEMS AND METHODS FOR RECOGNIZING SOUND AND MUSIC SIGNALS IN HIGH NOISE AND DISTORTION

CROSS-REFERENCE TO RELATED APPLICATIONS

This is a continuing application of Ser. No. 15/213,969 filed Jul. 19, 2016, which is a continuing application of Ser. No. 14/252,433 filed Apr. 14, 2014, which is a continuing application of Ser. No. 13/749,243 filed Jan. 24, 2013, which is a continuing application of Application Ser. No. 13/460,079 filed Apr. 30, 2012, which is a continuing application of application Ser. No. 12/954,004 filed Nov. 24, 2010, which is a continuing application of application Ser. No. 12/048,825, entitled "SYSTEM AND METHODS FOR RECOGNIZING SOUND AND MUSIC SIGNALS IN HIGH NOISE AND DISTORTION," filed Mar. 14, 2008 (and issued as U.S. Pat. No. 7,865,368), which is a continuing application of application Ser. No. 11/337,450, entitled "SYSTEMS AND METHODS FOR RECOGNIZING SOUND AND MUSIC SIGNALS IN HIGH NOISE AND DISTORTION," filed Jan. 23, 2006 (and issued as U.S. Pat. No. 7,346,512), which is a continuing application of application Ser. No. 09/839,476, entitled "SYSTEM AND METHODS FOR RECOGNIZING SOUND AND MUSIC SIGNALS IN HIGH NOISE AND DISTORTION," filed Apr. 20, 2001 (and issued as U.S. Pat. No. 6,990,453), which claims the benefit of U.S. Provisional Application No. 60/222,023 filed Jul. 31, 2000, and each and every of these cross-referenced related priority applications are herein incorporated by reference.

FIELD

The present disclosure relates generally to content-based information retrieval. More particularly, the disclosure relates to recognition of a media signal, including sound or music, that may be highly distorted or contain a high level of noise.

BACKGROUND

There is a growing need for automatic recognition of music or other audio signals generated from a variety of sources. For example, owners of copyrighted works or advertisers are interested in obtaining data on the frequency of broadcast of their material. Music tracking services provide playlists of major radio stations in large markets. Consumers would like to identify songs or advertising broadcast on the radio, so that they can purchase new and interesting music or other products and services. Any sort of continual or on-demand sound recognition is inefficient and labor intensive when performed by humans. An automated method of recognizing music or sound would thus provide significant benefit to consumers, artists, and a variety of industries. As the music distribution paradigm shifts from store purchases to downloading via the Internet, it is quite feasible to link directly computer-implemented music recognition with Internet purchasing and other Internet-based services.

Traditionally, recognition of songs played on the radio has been performed by matching radio stations and times at which songs were played with playlists provided either by the radio stations or from third party sources. This method is inherently limited to only radio stations for which information is available. Other methods rely on embedding inaudible codes within broadcast signals. The embedded signals are decoded at the receiver to extract identifying information about the broadcast signal. The disadvantage of this method is that special decoding devices are required to identify signals, and only those songs with embedded codes can be identified.

Any large-scale audio recognition requires some sort of content-based audio retrieval, in which an unidentified broadcast signal is compared with a database of known signals to identify similar or identical database signals. Note that content-based audio retrieval is different from existing audio retrieval by web search engines, in which only the metadata text surrounding or associated with audio files is searched. Also note that while speech recognition is useful for converting voiced signals into text that can then be indexed and searched using well-known techniques, it is not applicable to the large majority of audio signals that contain music and sounds. In some ways, audio information retrieval is analogous to text-based information retrieval provided by search engines. In other ways, however, audio recognition is not analogous: audio signals lack easily identifiable entities such as words that provide identifiers for searching and indexing. As such, current audio retrieval schemes index audio signals by computed perceptual characteristics that represent various qualities or features of the signal.

Content-based audio retrieval is typically performed by analyzing a query signal to obtain a number of representative characteristics, and then applying a similarity measure to the derived characteristics to locate database files that are most similar to the query signal. The similarity of received objects is necessarily a reflection of the perceptual characteristics selected. A number of content-based retrieval methods are available in the art. For example, U.S. Pat. No. 5,210,820, issued to Kenyon, discloses a signal recognition method in which received signals are processed and sampled to obtain signal values at each sampling point. Statistical moments of the sampled values are then computed to generate a feature vector that can be compared with identifiers of stored signals to retrieve similar signals. U.S. Pat. Nos. 4,450,531 and 4,843,562, both issued to Kenyon et al., disclose similar broadcast information classification methods in which cross-correlations are computed between unidentified signals and stored reference signals.

A system for retrieving audio documents by acoustic similarity is disclosed in J. T. Foote, "Content-Based Retrieval of Music and Audio," in C.-C. J. Kuo et al., editor, *Multimedia Storage and Archiving Systems II, Proc. of SPIE*, volume 3229, pages 138 147, 1997.Feature vectors are calculated by parameterizing each audio file into mel-scaled cepstral coefficients, and a quantization tree is grown from the parameterization data. To perform a query, an unknown signal is parameterized to obtain feature vectors that are then sorted into leaf nodes of the tree. A histogram is collected for each leaf node, thereby generating an N-dimensional vector representing the unknown signal. The distance between two such vectors is indicative of the similarity between two sound files. In this method, the supervised quantization scheme learns distinguishing audio features, while ignoring unimportant variations, based on classes into which the training data are assigned by a human. Depending upon the classification system, different acoustic features are chosen to be important. Thus this method is more suited for finding similarities between songs and sorting music into classes than it is to recognizing music.

A method for content-based analysis, storage, retrieval, and segmentation of audio information is disclosed in U.S.

Pat. No. 5,918,223, issued to Blum et al. In this method, a number of acoustical features, such as loudness, bass, pitch, brightness, bandwidth, and Mel-frequency cepstral coefficients, are measured at periodic intervals of each file. Statistical measurements of the features are taken and combined to form a feature vector. Audio data files within a database are retrieved based on the similarity of their feature vectors to the feature vector of an unidentified file.

A key problem of all of the above prior art audio recognition methods is that they tend to fail when the signals to be recognized are subject to linear and nonlinear distortion caused by, for example, background noise, transmission errors and dropouts, interference, band-limited filtering, quantization, time-warping, and voice-quality digital compression. In prior art methods, when a distorted sound sample is processed to obtain acoustical features, only a fraction of the features derived for the original recording are found. The resulting feature vector is therefore not very similar to the feature vector of the original recording, and it is unlikely that correct recognition can be performed. There remains a need for a sound recognition system that performs well under conditions of high noise and distortion.

Another problem with prior art methods is that they are computationally intensive and do not scale well. Real-time recognition is thus not possible using prior art methods with large databases. In such systems, it is unfeasible to have a database of more than a few hundred or thousand recordings. Search time in prior art methods tends to grow linearly with the size of the database, making scaling to millions of sounds recordings economically unfeasible. The methods of Kenyon also require large banks of specialized digital signal processing hardware.

Existing commercial methods often have strict requirements for the input sample to be able to perform recognition. For example, they require the entire song or at least 30 seconds of the song to be sampled or require the song to be sampled from the beginning. They also have difficulty recognizing multiple songs mixed together in a single stream. All of these disadvantages make prior art methods unfeasible for use in many practical applications.

SUMMARY

Accordingly, in examples described below, a method for recognizing an audio signal subject to a high level of noise and distortion is provided.

In other examples, a recognition method that can be performed in real time based on only a few seconds of the signal to be identified is provided.

In other examples, a recognition method than can recognize sounds based on samples from almost anywhere within the sound, not just at the beginning, is provided.

In other examples, a recognition method that does not require sound samples to be coded or correlated with particular radio stations or playlists is provided.

In other examples, a recognition method that can recognize each of multiple sound recordings mixed together in a single stream is provided.

In other examples, a sound recognition system in which the unknown sound can be provided to the system from any environment by virtually any known method is provided.

A method for recognizing a media sample, such as an audio sample, given a database index of a large number of known media files is described. The database index contains fingerprints representing features at particular locations of the indexed media files. The unknown media sample is identified with a media file in the database (the winning media file) whose relative locations of fingerprints most closely match the relative locations of fingerprints of the sample. In the case of audio files, the time evolution of fingerprints of the winning file matches the time evolution of fingerprints in the sample.

The method is preferably implemented in a distributed computer system and contains the following steps: computing a set of fingerprints at particular locations of the sample; locating matching fingerprints in the database index; generating correspondences between locations in the sample and locations in the file having equivalent fingerprints; and identifying media files for which a significant number of the correspondences are substantially linearly related. The file having the largest number of linearly related correspondences is deemed the winning media file. One method of identifying files with a large number of correspondences is to perform the equivalent of scanning for a diagonal line in the scatter plot generated from the pairs of correspondences. In one embodiment, identifying the media files with a large number of linear correspondences involves searching only a first subset of the media files. Files in the first subset have a higher probability of being identified than files that are not in the first subset. The probability of identification is preferably based on empirical frequency or recency measures of previous identifications, along with a priori projections of identification frequency. If no media files are identified in the first subset, then the second subset, containing the remaining files, is searched. Alternatively, the files can be ranked by probability and searched in order of the ranking. The search is terminated when a file is located.

Preferably, the particular locations within the sample are reproducibly computed in dependence on the sample. Such reproducibly computable locations are called "landmarks." Fingerprints are preferably numerical values. In one embodiment, each fingerprint represents a number of features of the media sample at each location, or offset slightly from the location.

The method is particularly useful for recognizing audio samples, in which case the particular locations are timepoints within the audio sample. These timepoints occur at, for example, local maxima of spectral Lp norms of the audio sample. Fingerprints can be computed by any analysis of the audio sample, and are preferably invariant to time stretching of the sample. Examples of fingerprints include spectral slice fingerprints, multi-slice fingerprints, LPC coefficients, cepstral coefficients, and frequency components of spectrogram peaks.

The present invention also provides a system for implementing the above method, containing a landmarking object for computing the particular locations, a fingerprinting object for computing the fingerprints, a database index containing the file locations and fingerprints for the media files, and an analysis object. The analysis object implements the method by locating matching fingerprints in the database index, generating correspondences, and analyzing the correspondences to select the winning media file.

Also provided is a program storage device accessible by a computer, tangibly embodying a program of instructions executable by the computer to perform method steps for the above method. An example tangible embodiment includes a non-transitory computer readable medium.

Additionally, the invention provides a method for creating an index of a number of audio files in a database, containing the following steps: computing a set of fingerprints at particular locations of each file; and storing the fingerprints, locations, and identifiers of the files in a memory. A corresponding fingerprint, location, and identifier are associated in the memory to form a triplet. Preferably, the locations, which can be timepoints within the audio file, are computed in dependence on the file and are reproducible. For example, the timepoints can occur at local maxima of spectral Lp norms of the audio file. In some cases, each fingerprint, which is preferably a numerical value, represents a number of features of the file near the particular location. Fingerprints can be computed from any analysis or digital signal processing of the audio file. Examples of fingerprints include spectral slice fingerprints, multi-slice fingerprints, LPC coefficients, cepstral coefficients, frequency components of spectrogram peaks, and linked spectrogram peaks.

In addition, the invention provides methods for identifying audio samples incorporating time-stretch invariant fingerprints and various hierarchical searching.

BRIEF DESCRIPTION OF THE FIGURES

FIGS. 8A-8C illustrate example index sets, an index list, and a master index list of the method of FIG. 3.

FIGS. 9A-9C illustrate an example index list, candidate list, and scatter list of the method of FIG. 1.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

The present invention provides a method for recognizing an exogenous media sample given a database containing a large number of known media files. It also provides a method for generating a database index that allows efficient searching using the recognition method of the invention. While the following discussion refers primarily to audio data, it is to be understood that the method of the present invention can be applied to any type of media samples and media files, including, but not limited to, text, audio, video, image, and any multimedia combinations of individual media types. In the case of audio, the present invention is particularly useful for recognizing samples that contain high levels of linear and nonlinear distortion caused by, for example, background noise, transmission errors and dropouts, interference, band-limited filtering, quantization, time-warping, and voice-quality digital compression. As will be apparent from the description below, the invention works under such conditions because it can correctly recognize a distorted signal even if only a small fraction of the computed characteristics survive the distortion. Any type of audio, including sound, voice, music, or combinations of types, can be recognized by the present invention. Example audio samples include recorded music, radio broadcast programs, and advertisements.

As used herein, an exogenous media sample is a segment of media data of any size obtained from a variety of sources as described below. In order for recognition to be performed, the sample must be a rendition of part of a media file indexed in a database used by the present invention. The indexed media file can be thought of as an original recording, and the sample as a distorted and/or abridged version or rendition of the original recording. Typically, the sample corresponds to only a small portion of the indexed file. For example, recognition can be performed on a ten-second segment of a five-minute song indexed in the database. Although the term "file" is used to describe the indexed entity, the entity can be in any format for which the necessary values (described below) can be obtained. Furthermore, there is no need to store or have access to the file after the values are obtained.

Figure 1:
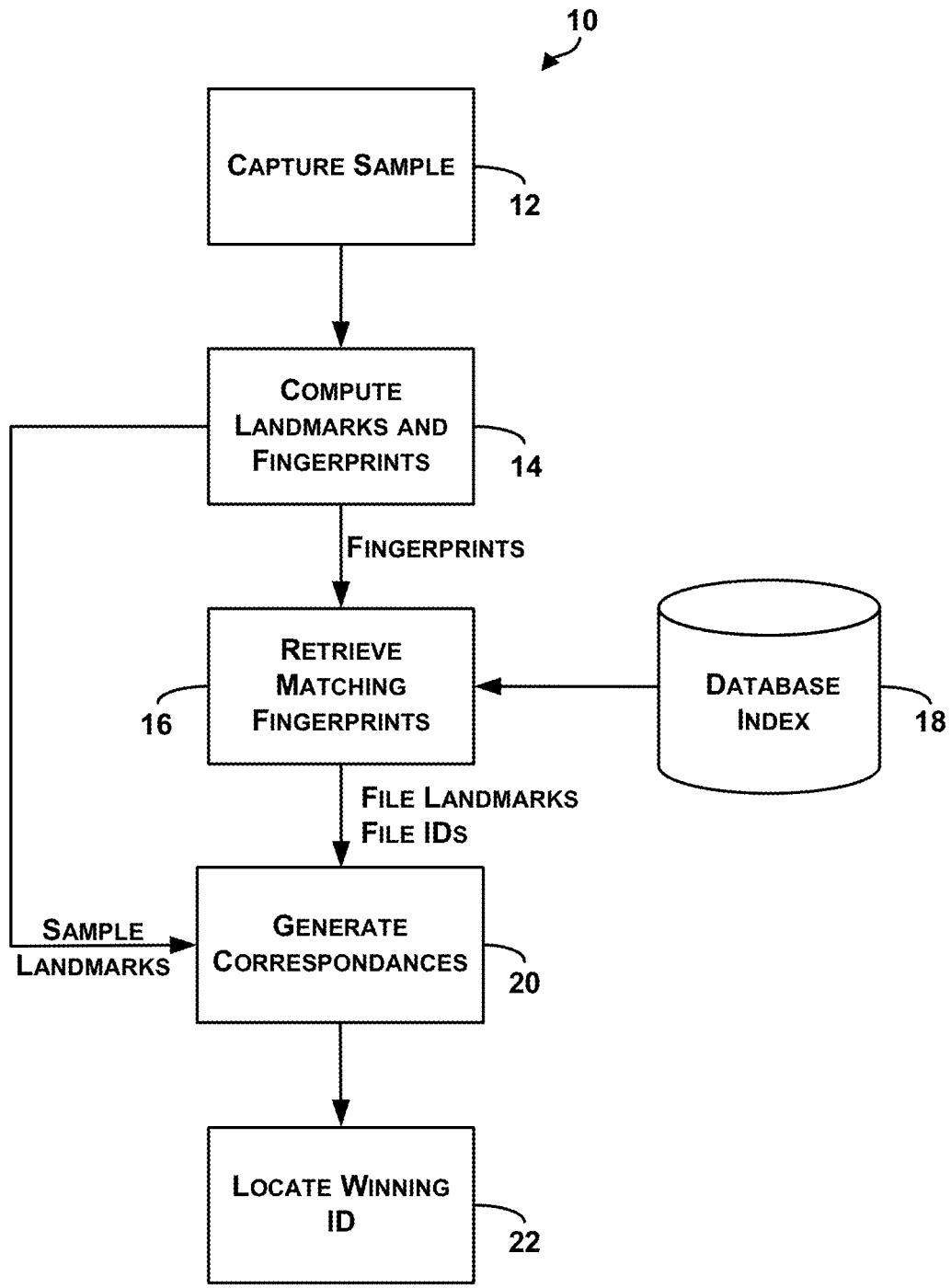
FIG. 1 is a flow diagram of an example method of the invention for recognizing a sound sample.

A block diagram conceptually illustrating the overall steps of a method 10 of the present invention is shown in FIG. 1. Individual steps are described in more detail below. The method identifies a winning media file, a media file whose relative locations of characteristic fingerprints most closely match the relative locations of the same fingerprints of the exogenous sample. After an exogenous sample is captured in step 12, landmarks and fingerprints are computed in step 14. Landmarks occur at particular locations, e.g., timepoints, within the sample. The location within the sample of the landmarks is preferably determined by the sample itself, i.e., is dependent upon sample qualities, and is reproducible. That is, the same landmarks are computed for the same signal each time the process is repeated. For each landmark, a fingerprint characterizing one or more features of the sample at or near the landmark is obtained. The nearness of a feature to a landmark is defined by the fingerprinting method used. In some cases, a feature is considered near a landmark if it clearly corresponds to the landmark and not to a previous or subsequent landmark. In other cases, features correspond to multiple adjacent landmarks. For example, text fingerprints can be word strings, audio fingerprints can be spectral components, and image fingerprints can be pixel RGB values. Two general embodiments of step 14 are described below, one in which landmarks and fingerprints are computed sequentially, and one in which they are computed simultaneously.

In step 16, the sample fingerprints are used to retrieve sets of matching fingerprints stored in a database index 18, in which the matching fingerprints are associated with landmarks and identifiers of a set of media files. The set of retrieved file identifiers and landmark values are then used to generate correspondence pairs (step 20) containing sample landmarks (computed in step 14) and retrieved file landmarks at which the same fingerprints were computed. The resulting correspondence pairs are then sorted by song identifier, generating sets of correspondences between sample landmarks and file landmarks for each applicable file. Each set is scanned for alignment between the file landmarks and sample landmarks. That is, linear correspondences in the pairs of landmarks are identified, and the set is scored according to the number of pairs that are linearly related. A linear correspondence occurs when a large number of corresponding sample locations and file locations can be described with substantially the same linear equation, within an allowed tolerance. For example, if the slopes of a number of equations describing a set of correspondence pairs vary by ±5%, then the entire set of correspondences is considered to be linearly related. Of course, any suitable tolerance can be selected. The identifier of the set with the highest score, i.e., with the largest number of linearly related correspondences, is the winning file identifier, which is located and returned in step 22.

As described further below, recognition can be performed with a time component proportional to the logarithm of the number of entries in the database. Recognition can be performed in essentially real time, even with a very large database. That is, a sample can be recognized as it is being obtained, with a small time lag. The method can identify a sound based on segments of 5-10 seconds and even as low 1-3 seconds. In a preferred embodiment, the landmarking and fingerprinting analysis, step 14, is carried out in real time as the sample is being captured in step 12. Database queries (step 16) are carried out as sample fingerprints become available, and the correspondence results are accumulated and periodically scanned for linear correspondences. Thus all of the method steps occur simultaneously, and not in the sequential linear fashion suggested in FIG. 1. Note that the method is in part analogous to a text search engine: a user submits a query sample, and a matching file indexed in the sound database is returned.

The method is typically implemented as software running on a computer system, with individual steps most efficiently implemented as independent software modules. Thus a system implementing the present invention can be considered to comprise a landmarking and fingerprinting object, an indexed database, and an analysis object for searching the database index, computing correspondences, and identifying the winning file. In the case of sequential landmarking and fingerprinting, the landmarking and fingerprinting object can be considered to be distinct landmarking and fingerprinting objects. Computer instruction code for the different objects is stored in a memory of one or more computers and executed by one or more computer processors. In one embodiment, the code objects are clustered together in a single computer system, such as an Intel-based personal computer or other workstation. In a preferred embodiment, the method is implemented by a networked cluster of central processing units (CPUs), in which different software objects are executed by different processors in order to distribute the computational load. Alternatively, each CPU can have a copy of all software objects, allowing for a homogeneous network of identically configured elements. In this latter configuration, each CPU has a subset of the database index and is responsible for searching its own subset of media files.

Figure 2:
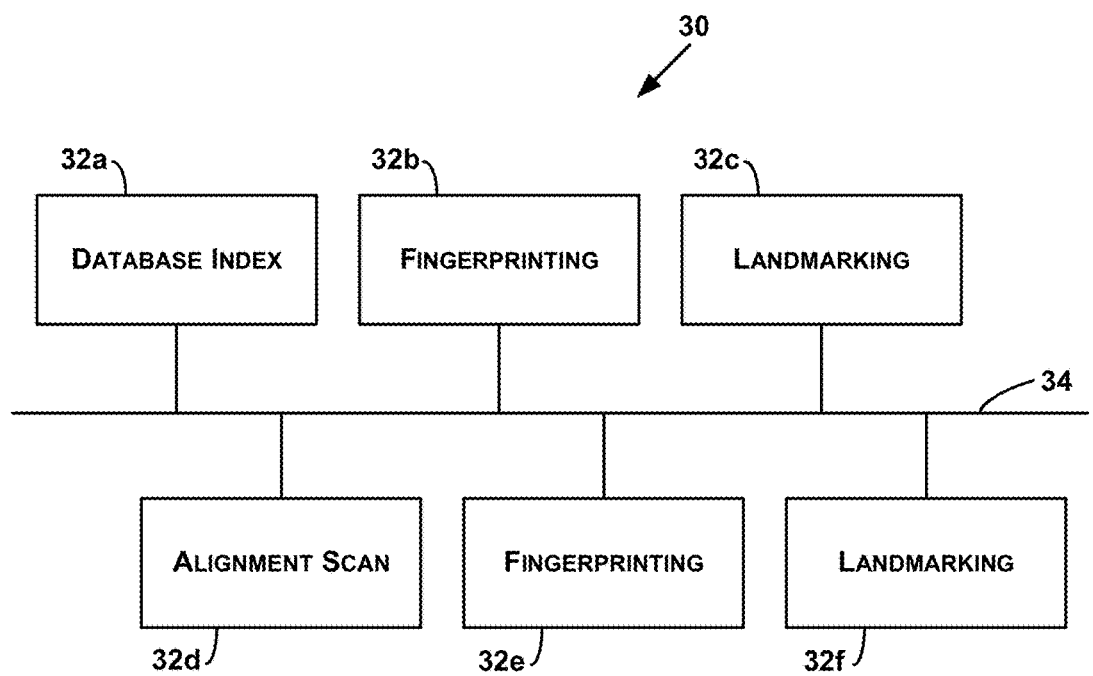
FIG. 2 is a block diagram of an example distributed computer system for implementing the method of FIG. 1.

Although the invention is not limited to any particular hardware system, an example of a preferred embodiment of a distributed computer system 30 is illustrated schematically in FIG. 2. System 30 contains a cluster of Linux-based processors 32*a*-32*f* connected by a multiprocessing bus architecture 34 or a networking protocol such as the Beowulf cluster computing protocol, or a mixture of the two. In such an arrangement, the database index is preferably stored in random access memory (RAM) on at least one node 32*a* in the cluster, ensuring that fingerprint searching occurs very rapidly. The computational nodes corresponding to the other objects, such as landmarking nodes 32*c* and 32*f*, fingerprinting nodes 32*b* and 32*e*, and alignment scanning node 32*d*, do not require as much bulk RAM as does node or nodes 32*a* supporting the database index. The number of computational nodes assigned to each object may thus be scaled according to need so that no single object becomes a bottleneck. The computational network is therefore highly parallelizable and can additionally process multiple simultaneous signal recognition queries that are distributed among available computational resources. Note that this makes possible applications in which large numbers of users can request recognition and receive results in near real time.

In an alternative embodiment, certain of the functional objects are more tightly coupled together, while remaining less tightly coupled to other objects. For example, the landmarking and fingerprinting object can reside in a physically separate location from the rest of the computational objects. One example of this is a tight association of the landmarking and fingerprinting objects with the signal capturing process. In this arrangement, the landmarking and fingerprinting object can be incorporated as additional hardware or software embedded in, for example, a mobile phone, Wireless Application Protocol (WAP) browser, personal digital assistant (PDA), or other remote terminal, such as the client end of an audio search engine. In an Internet-based audio search service, such as a content identification service, the landmarking and fingerprinting object can be incorporated into the client browser application as a linked set of software instructions or a software plug-in module such as a Microsoft dynamic link library (DLL). In these embodiments, the combined signal capture, landmarking, and fingerprinting object constitutes the client end of the service. The client end sends a feature-extracted summary of the captured signal sample containing landmark and fingerprint pairs to the server end, which performs the recognition. Sending this feature-extracted summary to the server, instead of the raw captured signal, is advantageous because the amount of data is greatly reduced, often by a factor of 500 or more. Such information can be sent in real time over a low-bandwidth side channel along with or instead of, e.g., an audio stream transmitted to the server. This enables performing the invention over public communications networks, which offer relatively small-sized bandwidths to each user.

The method will now be described in detail with reference to audio samples and audio files indexed in a sound database. The method consists of two broad components, sound database index construction and sample recognition.

Database Index Construction

Before sound recognition can be performed, a searchable sound database index can be constructed. As used herein, a database is any indexed collection of data, and is not limited to commercially available databases. In the database index, related elements of data are associated with one another, and individual elements can be used to retrieve associated data. The sound database index contains an index set for each file or recording in the selected collection or library of recordings, which may include speech, music, advertisements, sonar signatures, or other sounds. Each recording also has a unique identifier, sound_ID. The sound database itself does not necessarily store the audio files for each recording, but the sound_IDs can be used to retrieve the audio files from elsewhere. The sound database index is expected to be very large, containing indices for millions or even billions of files. New recordings are preferably added incrementally to the database index.

Figure 3:
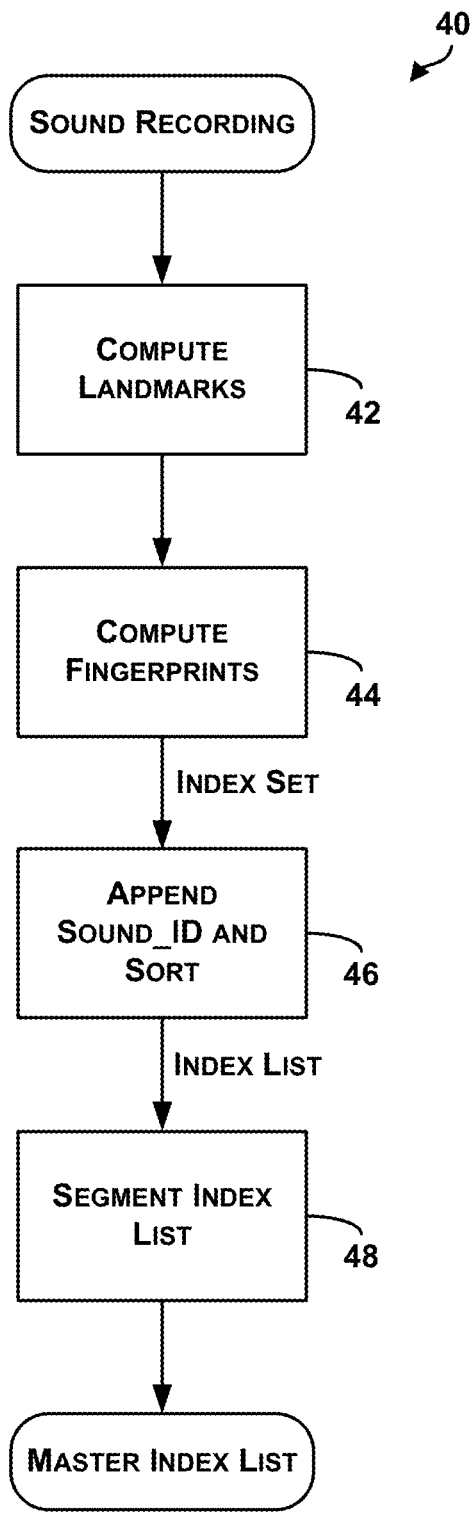
FIG. 3 is a flow diagram of an example method for constructing a database index of sound files used in the method of FIG. 1.

A block diagram of a preferred method 40 for constructing the searchable sound database index according to a first embodiment is shown in FIG. 3. In this embodiment, landmarks are first computed, and then fingerprints are computed at or near the landmarks. As will be apparent to one of average skill in the art, alternative methods may be devised for constructing the database index. In particular, many of the steps listed below are optional, but serve to generate a database index that is more efficiently searched. While searching efficiency is important for real-time sound recognition from large databases, small databases can be searched relatively quickly even if they have not been sorted optimally.

Figure 4:
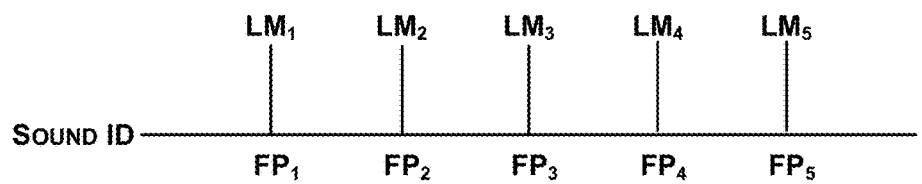
FIG. 4 schematically illustrates example landmarks and fingerprints computed for a sound sample.

To index the sound database, each recording in the collection is subjected to a landmarking and fingerprinting analysis that generates an index set for each audio file. FIG. 4 schematically illustrates a segment of a sound recording for which landmarks (LM) and fingerprints (FP) have been computed. Landmarks occur at specific timepoints of the sound and have values in time units offset from the beginning of the file, while fingerprints characterize the sound at or near a particular landmark. Thus, in this embodiment, each landmark for a particular file is unique, while the same fingerprint can occur numerous times within a single file or multiple files.

In step 42, each sound recording is landmarked using methods to find distinctive and reproducible locations within the sound recording. A preferred landmarking algorithm is able to mark the same timepoints within a sound recording despite the presence of noise and other linear and nonlinear distortion. Some landmarking methods are conceptually independent of the fingerprinting process described below, but can be chosen to optimize performance of the latter. Landmarking results in a list of timepoints {$landmark_k$} within the sound recording at which fingerprints are subsequently calculated. A good landmarking scheme marks about 5-10 landmarks per second of sound recording; of course, landmarking density depends on the amount of activity within the sound recording.

A variety of techniques are possible for computing landmarks, all of which are within the scope of the present invention. The specific technical processes used to implement the landmarking schemes of the invention are known in the art and will not be discussed in detail. A simple landmarking technique, known as Power Norm, is to calculate the instantaneous power at every possible timepoint in the recording and to select local maxima. One way of doing this is to calculate the envelope by rectifying and filtering the waveform directly. Another way is to calculate the Hilbert transform (quadrature) of the signal and use the sum of the magnitudes squared of the Hilbert transform and the original signal.

Figure 5:
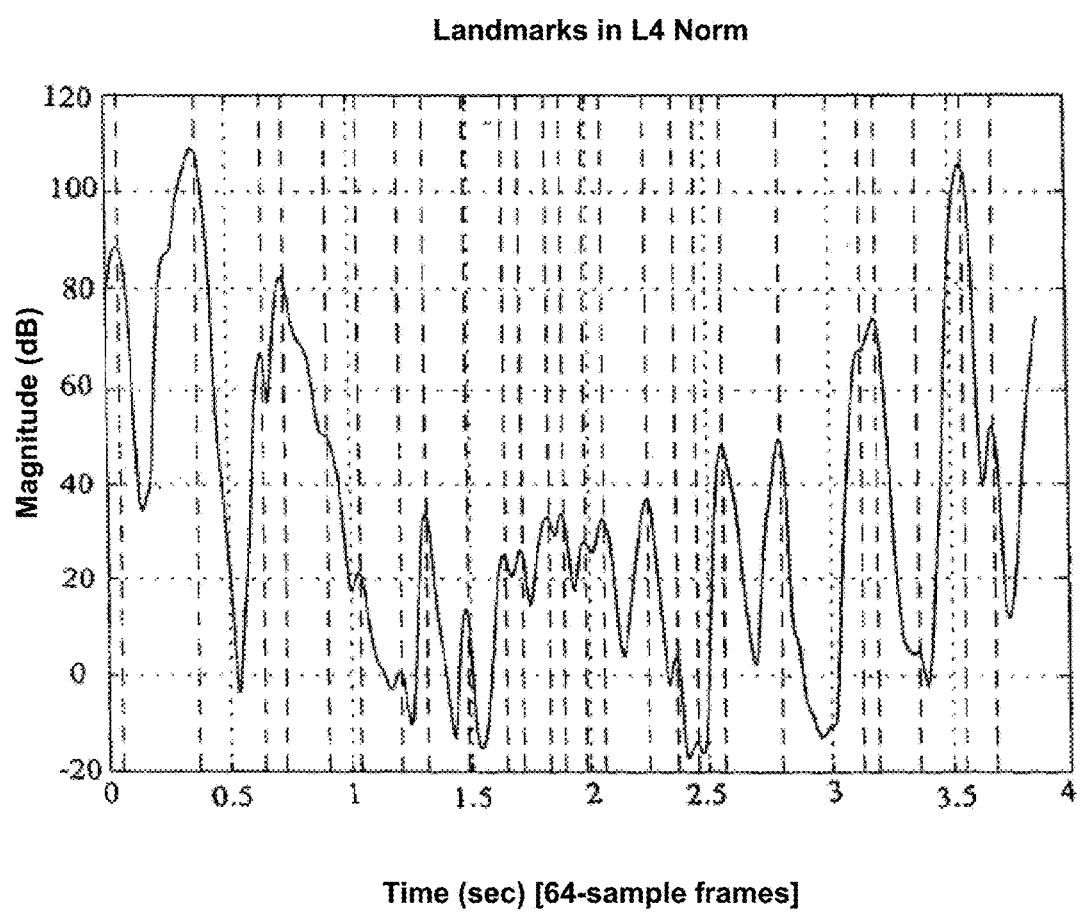
FIG. 5 is a graph of example L4 norms for a sound sample, illustrating the selection of landmarks.

The Power Norm method of landmarking is good at finding transients in the sound signal. The Power Norm is actually a special case of the more general Spectral Lp Norm in which p=2. The general Spectral Lp Norm is calculated at each time along the sound signal by calculating a short-time spectrum, for example via a Hanning-windowed Fast Fourier Transform (FFT). A preferred embodiment uses a sampling rate of 8000 Hz, an FFT frame size of 1024 samples, and a stride of 64 samples for each time slice. The Lp norm for each time slice is then calculated as the sum of the $p^{th}$ power of the absolute values of the spectral components, optionally followed by taking the $p^{th}$ root. As before, the landmarks are chosen as the local maxima of the resulting values over time. An example of the Spectral Lp Norm method is shown in FIG. 5, a graph of the L4 norm as a function of time for a particular sound signal. Dashed lines at local maxima indicate the location of the chosen landmarks.

When p=∞, the L∞ norm is effectively the maximum norm. That is, the value of the norm is the absolute value of the largest spectral component in the spectral slice. This norm results in robust landmarks and good overall recognition performance, and is preferred for tonal music.

Alternatively, "multi-slice" spectral landmarks can be calculated by taking the sum of $p^{th}$ powers of absolute values of spectral components over multiple timeslices at fixed or variable offsets from each other, instead of a single slice. Finding the local maxima of this extended sum allows optimization of placement of the multi-slice fingerprints, described below.

Once the landmarks have been computed, a fingerprint is computed at each landmark timepoint in the recording in step 44. The fingerprint is generally a value or set of values that summarizes a set of features in the recording at or near the timepoint. In a currently preferred embodiment, each fingerprint is a single numerical value that is a hashed function of multiple features. Possible types of fingerprints include spectral slice fingerprints, multi-slice fingerprints, LPC coefficients, and cepstral coefficients. Of course, any type of fingerprint that characterizes the signal or features of the signal near a landmark is within the scope of the present invention. Fingerprints can be computed by any type of digital signal processing or frequency analysis of the signal.

To generate spectral slice fingerprints, a frequency analysis is performed in the neighborhood of each landmark timepoint to extract the top several spectral peaks. A simple fingerprint value is just the single frequency value of the strongest spectral peak. The use of such a simple peak results in surprisingly good recognition in the presence of noise; however, single-frequency spectral slice fingerprints tend to generate more false positives than other fingerprinting schemes because they are not unique. The number of false positives can be reduced by using fingerprints consisting of a function of the two or three strongest spectral peaks. However, there may be a higher susceptibility to noise if the second-strongest spectral peak is not sufficiently strong enough to distinguish it from its competitors in the presence of noise. That is, the calculated fingerprint value may not be sufficiently robust to be reliably reproducible. Despite this, the performance of this case is also good.

In order to take advantage of the time evolution of many sounds, a set of timeslices is determined by adding a set of time offsets to a landmark timepoint. At each resulting timeslice, a spectral slice fingerprint is calculated. The resulting set of fingerprint information is then combined to form one multitone or multi-slice fingerprint. Each multi-slice fingerprint is much more unique than the single spectral slice fingerprint, because it tracks temporal evolution, resulting in fewer false matches in the database index search described below. Experiments indicate that because of their increased uniqueness, multi-slice fingerprints computed from the single strongest spectral peak in each of two timeslices result in much faster computation (about 100 times faster) in the subsequent database index search, but with some degradation in recognition percentage in the presence of significant noise.

Alternatively, instead of using a fixed offset or offsets from a given timeslice to calculate a multi-slice fingerprint, variable offsets can be used. The variable offset to the chosen slice is the offset to the next landmark, or a landmark in a certain offset range from the "anchor" landmark for the fingerprint. In this case, the time difference between the landmarks is also encoded into the fingerprint, along with multi-frequency information. By adding more dimensions to the fingerprints, they become more unique and have a lower chance of false match.

In addition to spectral components, other spectral features can be extracted and used as fingerprints. Linear predictive coding (LPC) analysis extracts the linearly predictable features of a signal, such as spectral peaks, as well as spectral shape. LPC is well known in the art of digital signal processing. For the present invention, LPC coefficients of waveform slices anchored at landmark positions can be used as fingerprints by hashing the quantized LPC coefficients into an index value.

Cepstral coefficients are useful as a measure of periodicity and can be used to characterize signals that are harmonic, such as voices or many musical instruments. Cepstral analysis is well known in the art of digital signal processing. For the present invention, a number of cepstral coefficients are hashed together into an index and used as a fingerprint.

Figure 6:
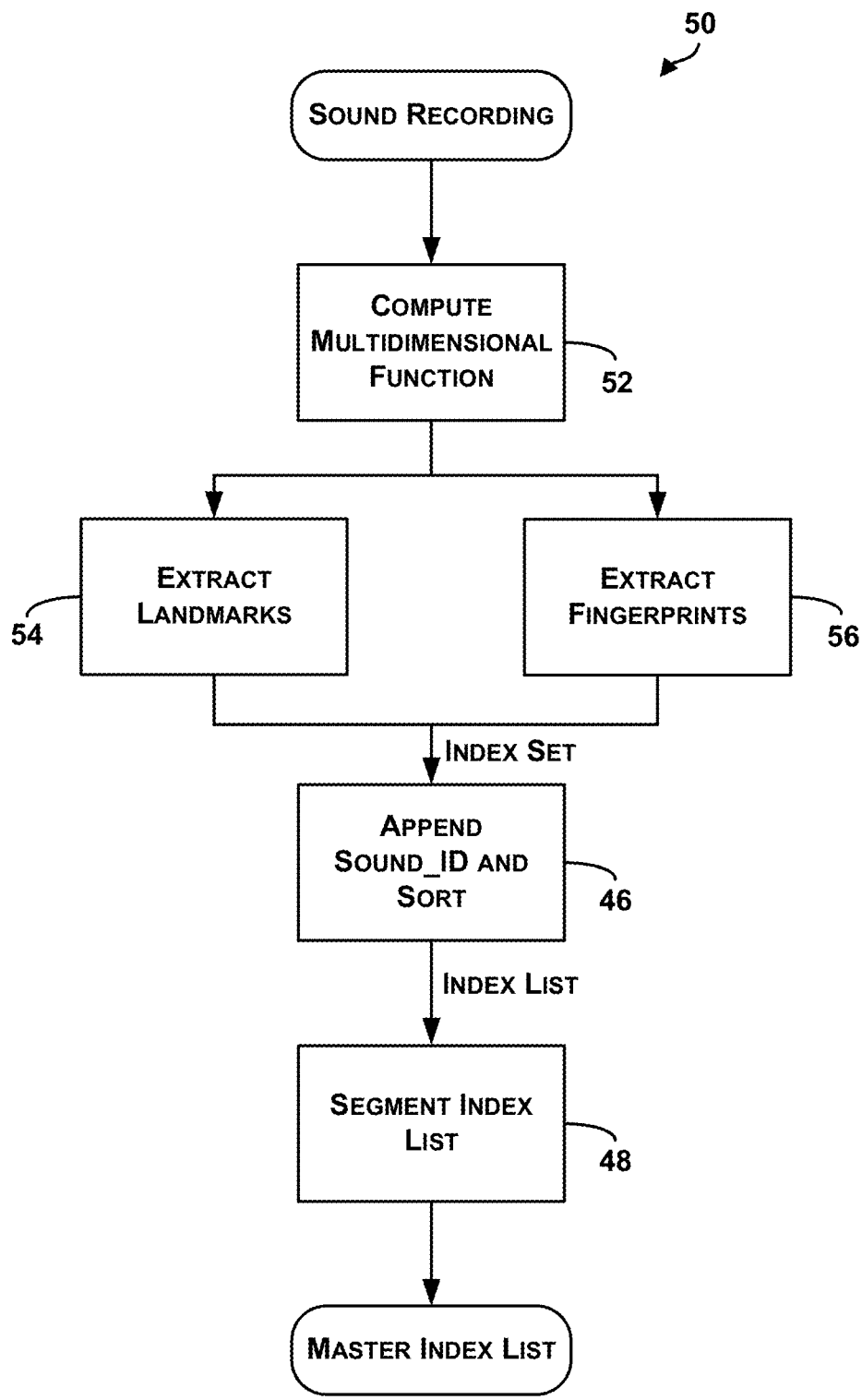
FIG. 6 is a flow diagram of an alternative embodiment for constructing a database index of sound files used in the method of FIG. 1.

An alternative embodiment 50, in which landmarks and fingerprints are computed simultaneously, is shown in FIG. 6. Steps 42 and 44 of FIG. 3 are replaced by steps 52, 54, and 56. As described below, a multidimensional function is computed from the sound recording in step 52, and landmarks (54) and fingerprints (56) are extracted from the function.

Figure 7A:
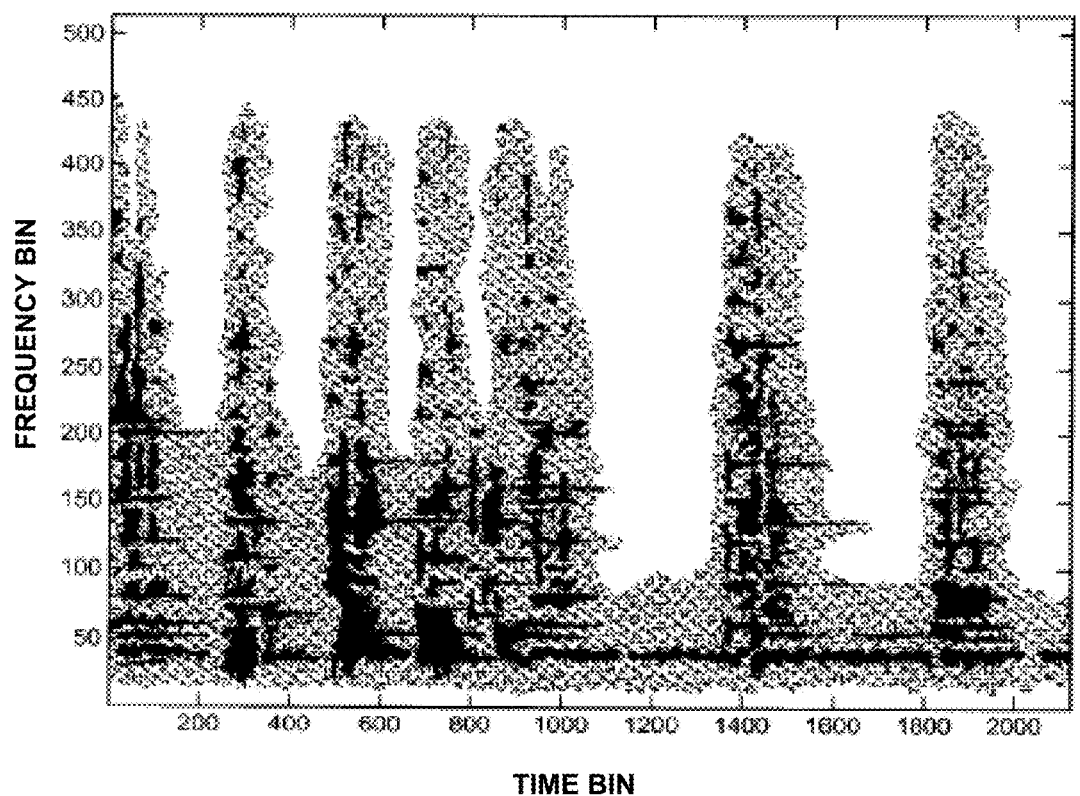
FIGS. 7A-7C show an example spectrogram with salient points and linked salient points indicated.
Figure 7B:
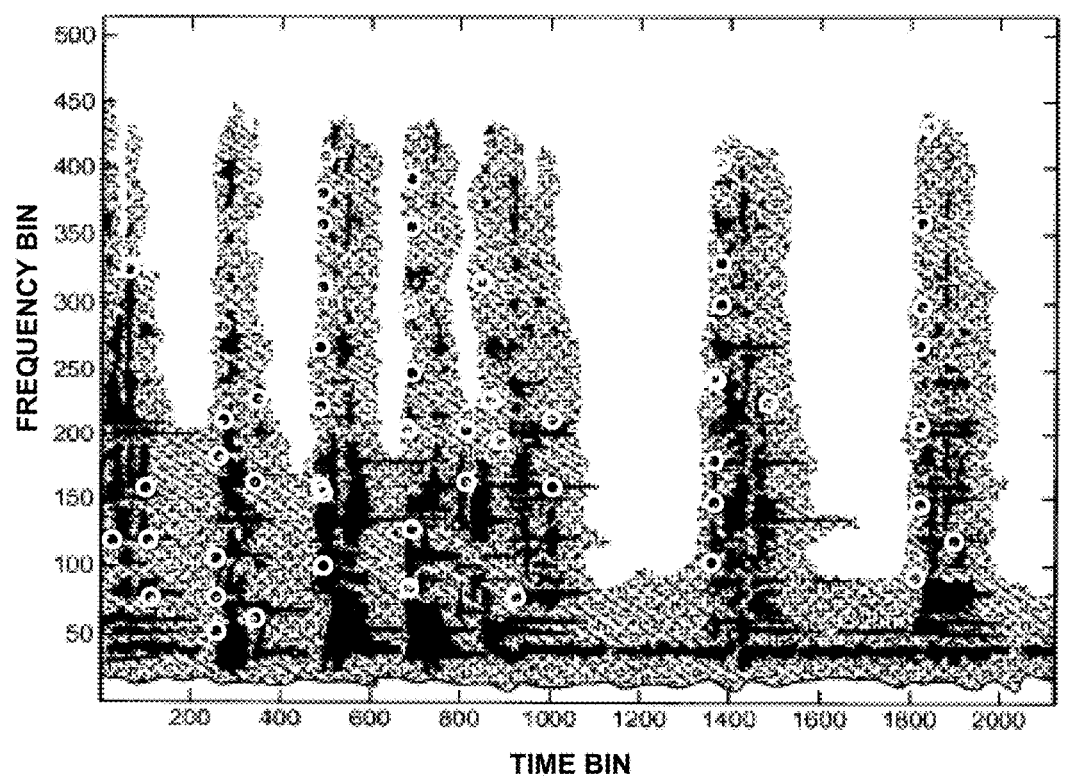

In one implementation of the embodiment of FIG. 6, landmarks and fingerprints are computed from a spectrogram of the sound recording. A spectrogram is a time-frequency analysis of a sound recording in which windowed and overlapped frames of sound samples are spectrally analyzed, typically using a Fast Fourier Transform (FFT). As before, a preferred embodiment uses a samping rate of 8000 Hz, an FFT frame size of 1024 samples, and a stride of 64 samples for each time slice. An example of a spectrogram is shown in FIG. 7A. Time is on the horizontal axis, and frequency is on the vertical axis. Each sequential FFT frame is stacked vertically at corresponding evenly-spaced intervals along the time axis. A spectrogram plot depicts the energy density at each time-frequency point; darker areas on the plot represent higher energy density. Spectrograms are well-known in the art of audio signal processing. For the present invention, landmarks and fingerprints can be obtained from salient points such as local maxima of the spectrogram, circled in the spectrogram of FIG. 7B. For example, time and frequency coordinates of each peak are obtained, the time taken to be the landmark, and the frequency used to compute the corresponding fingerprint. This spectrogram peak landmark is similar to the L∞ norm, in which the maximum absolute value of the norm determines the landmark location. In the spectrogram, however, the local maximum search is taken over patches of the time-frequency plane, rather than over an entire timeslice.

In this context, the set of salient points resulting from the point extraction analysis of a sound recording is referred to as a constellation. For a constellation consisting of local maxima, a preferred analysis is to select points that are energy maxima of the time-frequency plane over a neighborhood around each selected point. For example, a point at coordinate $(t_0, f_0)$ is selected if it is the maximum-energy point within a rectangle with corners $(t_0-T, f_0-F)$, $(t_0-T, f_0+F)$, $(t_0+T, f_0-F)$, and $(t_0+T, f_0+F)$ i.e., a rectangle with sides of length 2T and 2F, with T and F chosen to provide a suitable number of constellation points. The bounds of the rectangle can also vary in size according to frequency value. Of course, any region shape can be used. The maximum-energy criterion can also be weighted such that a competing time-frequency energy peak is inversely weighted according to a distance metric in the time-frequency plane, i.e., more distant points have lower weighting. For example, the energy can be weighted as $$\frac{S(t, f)}{1 + C_t(t - t_o)^2 + C_f(f - f_o)^2},$$

where $S(t,f)$ is the magnitude squared value of the spectrogram at point $(t,f)$, and $C_t$ and $C_f$ are positive values (not necessarily constants). Other distance-weighting functions are possible. Local maxima selection constraints can be applied to other (non-maximum) salient point feature extraction schemes, and are within the scope of the invention.

This method results in pairs of values that are very similar to the single-frequency spectral fingerprint described above, with many of the same properties. The spectrogram time-frequency method generates more landmark/fingerprint pairs than the single-frequency method, but can also yield many false matches in the matching stage described below. However, it provides more robust landmarking and fingerprinting than the single-frequency spectral fingerprint, because dominant noise in the sound sample may not extend to all parts of the spectrum in each slice. That is, there are most likely some landmark and fingerprint pairs in parts of the spectrum that are not affected by the dominant noise.

This spectrogram landmarking and fingerprinting method is a special case of feature analysis methods that compute a multidimensional function of the sound signal, in which one of the dimensions is time, and locate salient points in the function values. Salient points can be local maxima, local minima, zero crossings, or other distinctive features. The landmarks are taken to be the time coordinates of the salient points, and the corresponding fingerprints are computed from at least one of the remaining coordinates. For example, the non-time coordinate(s) of the multidimensional salient point can be hashed together to form a multidimensional functional fingerprint.

Figure 7C:
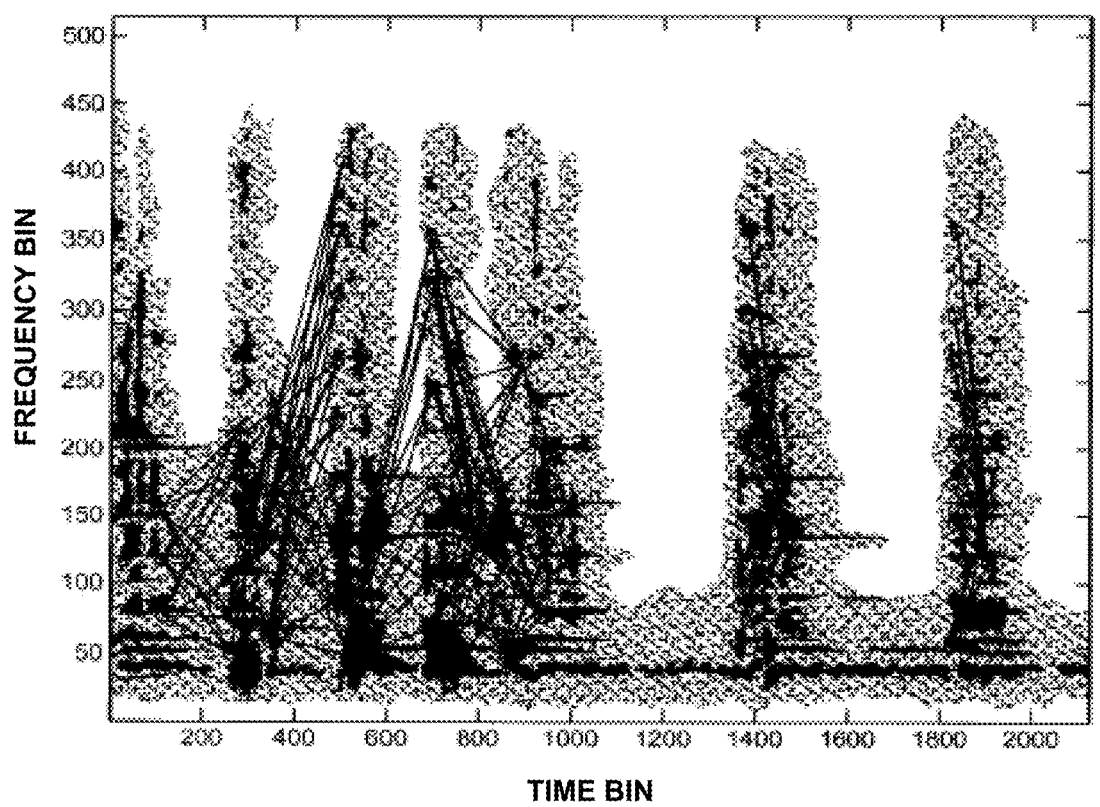

The variable offset method described above for multi-slice spectral fingerprints can be applied to spectrogram or other multidimensional function fingerprints. In this case, points in a constellation are linked together to form linked points, as illustrated in the spectrogram shown in FIG. 7C. Each point in the constellation serves as an anchor point defining the landmark time, and the remaining coordinate values of the other points are combined to form the linked fingerprint. Points that are near each other, for example, as defined below, are linked together to form more complex aggregate feature fingerprints that may be more easily distinguished and searched. As with the multi-slice spectral fingerprints, the goal of combining information from multiple linked salient points into a single fingerprint is to create more diversity of possible fingerprint values, thereby decreasing the probability of false match, i.e., decreasing the probability that the same fingerprint describes two different music samples.

In principle, each of N salient points can be linked to each other point in a two-point linkage scheme, producing about $N^2/2$ combinations. Similarly, for a K-point linkage, the number of possible combinations resulting from a constellation is of order $N^K$. In order to avoid such a combinatorial explosion, it is desirable to constrain the neighborhood of points that are linked together. One way to accomplish such a constraint is to define a "target zone" for each anchor point. An anchor point is then linked with points in its target zone. It is possible to select a subset of points within the target zone to link to—not every point needs to be linked. For example, just the points associated with the strongest peaks in the target zone can be linked. A target zone can have a fixed shape or vary according to characteristics of the anchor point. A simple example of a target zone of an anchor point $(t_0, f_0)$ for a spectrogram peak constellation is the set of points $(t,f)$ in the spectrogram strip such that t is in the interval $[t_0+L, t_0+L+W]$, where L is the lead into the future and W is the width of the target zone. In this scheme, all frequencies are allowed in the target zone. L or W can be variable, for example, if a rate control mechanism is used to modulate the number of linkage combinations being produced. Alternatively, frequency restrictions can be implemented, for example, by constraining the target zone such that the frequency f is in the interval $[f_0-F, f_0+F]$, where F is a bounding parameter. An advantage of a frequency constraint is that in psychoacoustics, it is known that melodies tend to cohere better when sequences of notes have frequencies that are near each other. Such a constraint may enable more "psychoacoustically realistic" recognition performance, although modeling psychoacoustics is not necessarily a goal of this invention. It is also possible to consider the opposite rule, in which f is chosen outside of the region $[f_0-F, f_0+F]$. This forces the linkage of points that are different from each other in frequency, possibly avoiding cases in which constellation extraction artifacts produce stuttering sequences of time-frequency points that are close in time and have the same frequency. As with other locality parameters, F is not necessarily constant and can, for example, be a function of $f_0$.

When including time coordinates of non-anchor salient points in fingerprint values, relative time values must be used to allow the fingerprints to be time invariant. For example, the fingerprint can be a function of (i) non-time coordinate values and/or (ii) difference(s) of the corresponding time coordinate values of the salient points. The time difference(s) can be taken, for example, with respect to the anchor point or as successive differences between sequential salient points in the linked set. The coordinate and difference values can be packed into concatenated bit fields to form the hashed fingerprint. As will be apparent to one of average skill in the art, many other ways of mapping sets of coordinate values into a fingerprint value exist and are within the scope of the present invention.

A concrete instantiation of this scheme uses N>1 linked spectrogram peaks with coordinates $(t_k, f_k)$, k=1, ..., N. Then, (i) the time $t_1$ of the first peak is taken as the landmark time, and (ii) the time differences $\Delta t_k = t_k - t_1$, k=2, ..., N, plus the frequencies $f_k$, k=1, ..., N, of the linked peaks are hashed together to form a fingerprint value. The fingerprint can be computed from all or from a subset of all available $\Delta t_k$ and $f_k$ coordinates. For example, some or all of the time difference coordinates can be omitted if desired.

Another advantage of using multiple points to form the fingerprint is that the fingerprint encoding can be made invariant with respect to time stretching, e.g., when a sound recording is played back at a speed different than the original recording speed. This advantage applies to both the spectrogram and the timeslice methods. Note that in a stretched time signal, time differences and frequency have a reciprocal relationship (e.g., decreasing the time difference between two points by a factor of two doubles the frequency). This method takes advantage of that fact by combining time differences and frequencies in a way that removes the time stretching from the fingerprint.

For example, in an N-point spectrogram peak case with coordinate values $(t_k, f_k)$, k=1, ..., N, the available intermediate values to hash into a fingerprint are $\Delta t_k = t_k - t_1$, k=2, ..., N, and $f_k$, k=1, ..., N. The intermediate values can then be made invariant with respect to time-stretching by taking one of the frequencies as a reference frequency, say $f_1$, and forming (i) quotients with the remaining frequencies and (ii) products with the time differences. For example, intermediate values can be $g_k = f_k/f_1$, k=2, ..., and $s_k = \Delta t_k f_1$, k=2, ..., N. If the sample is sped up by a factor of $\alpha$, then the frequency $f_k$ becomes $\alpha f_k$ and the time difference $\Delta t_k$ becomes $\Delta t_k/\alpha$, so that $g_k = \alpha f_k/\alpha f_1 = f_k/f_1$, and $s_k = (\Delta t_k/\alpha)(\alpha f_1) = \Delta t_k f_1$. These new intermediate values are then combined using a function to form a hashed fingerprint value that is independent of time stretching. For example, the $g_k$ and $s_k$ values may be hashed by packing them into concatenated bitfields.

Alternatively, instead of a reference frequency, a reference time difference may be used, e.g., $\Delta t_2$. In this case, the new intermediate values are calculated as the (i) quotients $\Delta t_k/\Delta t_2$ with the remaining time differences and (ii) products $\Delta t_2 f_k$ with the frequencies. This case is equivalent to using a reference frequency, because the resulting values can be formed from products and quotients of the $g_k$ and $s_k$ values above. Reciprocals of the frequency ratios can be used equally effectively; sums and differences of logarithmic values of the original intermediate values can also be substituted for products and differences, respectively. Any time-stretch-independent fingerprint value obtained by such commutations, substitutions, and permutations of mathematical operations is within the scope of the invention. Additionally, multiple reference frequencies or reference time differences, which also relativize time differences, can be used. The use of multiple reference frequencies or reference time differences is equivalent to the use of a single reference, because the same result can be achieved by arithmetic manipulation of the $g_k$ and $s_k$ values.

Returning to FIGS. 3 and 6, landmarking and fingerprinting analyses by any of the above methods result in an index set for each Sound_ID, as shown in FIG. 8A. An index set for a given sound recording is a list of pairs of values (fingerprint, landmark). Each indexed recording typically has on the order of one thousand (fingerprint, landmark) pairs in its index set. In the first embodiment described above, in which the landmarking and fingerprinting techniques are essentially independent, they can be treated as separate and interchangeable modules. Depending upon the system, signal quality, or type of sound to be recognized, one of a number of different landmarking or fingerprinting modules can be employed. In fact, because the index set is composed simply of pairs of values, it is possible and often preferable to use multiple landmarking and fingerprinting schemes simultaneously. For example, one landmarking and fingerprinting scheme may be good at detecting unique tonal patterns, but poor at identifying percussion, whereas a different algorithm may have the opposite attributes. The use of multiple landmarking/fingerprinting strategies results in a more robust and richer range of recognition performance. Different fingerprinting techniques can be used together by reserving certain ranges of fingerprint values for certain kinds of fingerprints. For example, in a 32-bit fingerprint value, the first 3 bits can be used to specify which of 8 fingerprinting schemes the following 29 bits are encoding.

After index sets are generated for each sound recording to be indexed in the sound database, a searchable database index is constructed in such a way as to allow fast (i.e., log time) searching. This is accomplished in step 46 by constructing a list of triplets (fingerprint, landmark, sound_ID), obtained by appending the corresponding sound_ID to each doublet within each index set. All such triplets for all sound recordings are collected into a large index list, an example of which is shown in FIG. 8B. In order to optimize the subsequent search process, the list of triplets is then sorted according to fingerprint. Fast sorting algorithms are well known in the art and extensively discussed in D. E. Knuth, *The Art of Computer Programming*, Volume 3: Sorting and Searching, Reading, Mass.: Addison-Wesley, 1998, herein incorporated by reference. High-performance sorting algorithms can be used to sort the list in N log N time, where N is the number of entries in the list.

Figure 8C:
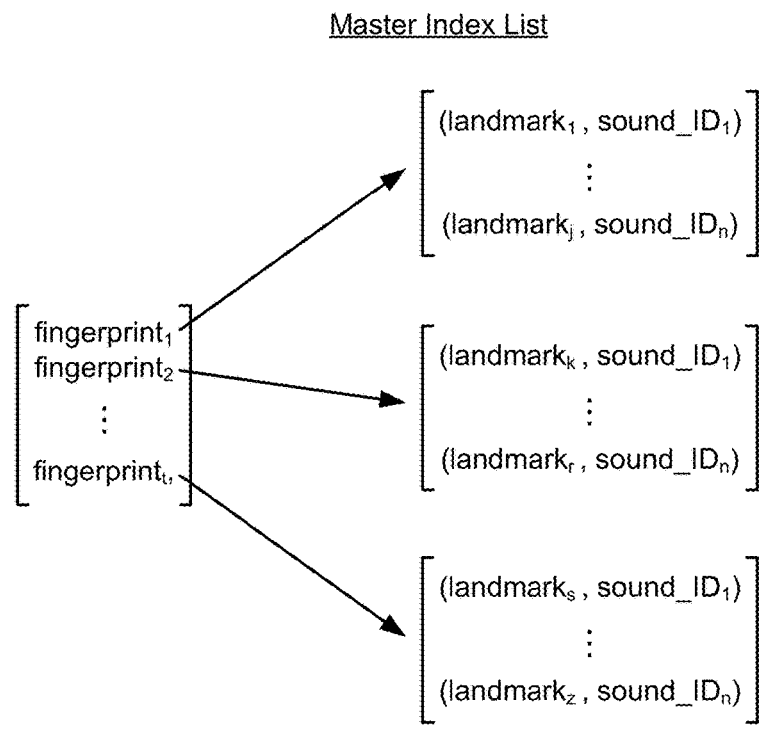

Once the index list is sorted, it is further processed in step 48 by segmenting such that each unique fingerprint in the list is collected into a new master index list, an example of which is shown in FIG. 8C. Each entry in the master index list contains a fingerprint value and a pointer to a list of (landmark, sound_ID) pairs. Depending upon the number and character of recordings indexed, a given fingerprint can appear hundreds of times or more within the entire collection. Rearranging the index list into a master index list is optional but saves memory, because each fingerprint value appears only once. It also speeds up the subsequent database search, since the effective number of entries in the list is greatly reduced to a list of unique values. Alternatively, the master index list can be constructed by inserting each triplet into a B-tree. Other possibilities exist for constructing the master index list, as known to those of average skill in the art. The master index list is preferably held in system memory, such as DRAM, for fast access during signal recognition. The master index list can be held in the memory of a single node within the system, as illustrated in FIG. 2. Alternatively, the master index list can be broken up into pieces distributed among multiple computational nodes. Preferably, the sound database index referred to above is the master index list illustrated in FIG. 8C.

The sound database index is preferably constructed offline and updated incrementally as new sounds are incorporated into the recognition system. To update the list, new fingerprints can be inserted into the appropriate location in the master list. If new recordings contain existing fingerprints, the corresponding (landmark, sound_ID) pairs are added to the existing lists for those fingerprints.

Recognition System

Using the master index list generated as described above, sound recognition is performed on an exogenous sound sample, typically supplied by a user interested in identifying the sample. For example, the user hears a new song on the radio and would like to know the artist and title of the song. The sample can originate from any type of environment, such as a radio broadcast, disco, pub, submarine, sound file, segment of streaming audio, or stereo system, and may contain background noise, dropouts, or talking voices. The user may store the audio sample in a storage device such as an answering machine, computer file, tape recorder, or telephone or mobile phone voicemail system before providing it to the system for recognition. Based on system setup and user constraints, the audio sample is provided to the recognition system of the present invention from any number of analog or digital sources, such as a stereo system, television, compact disc player, radio broadcast, answering machine, telephone, mobile telephone, Internet streaming broadcast, FTP, computer file as an email attachment, or any other suitable means of transmitting such recorded material. Depending on the source, the sample can be in the form of acoustic waves, radio waves, a digital audio PCM stream, a compressed digital audio stream (such as Dolby Digital or MP3), or an Internet streaming broadcast. A user interacts with the recognition system through a standard interface such as a telephone, mobile telephone, web browser, or email. The sample can be captured by the system and processed in real time, or it can be reproduced for processing from a previously captured sound (e.g., a sound file). During capture, the audio sample is sampled digitally and sent to the system by a sampling device such as a microphone. Depending upon the capture method, the sample is likely subjected to further degradation due to limitations of the channel or sound capture device.

Figure 9A:
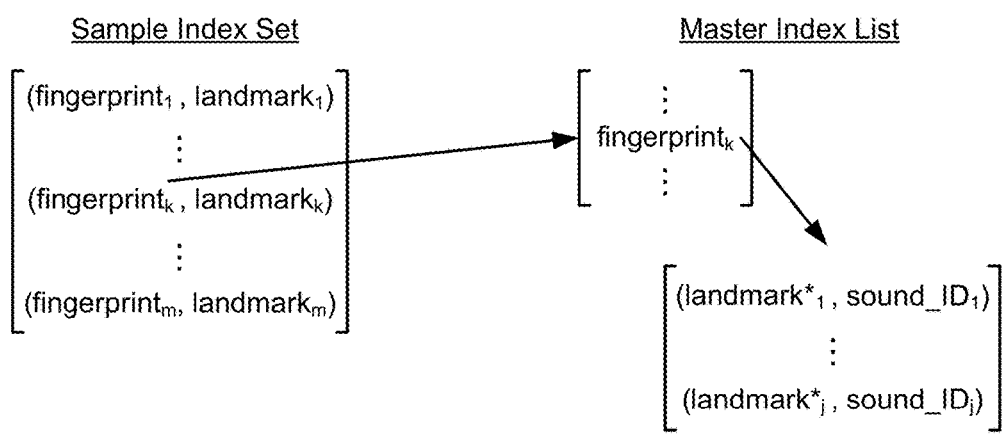

Once the sound signal has been converted into digital form, it is processed for recognition. As with the construction of index sets for database files, landmarks and fingerprints are calculated for the sample using the same algorithm that was used for processing the sound recording database. The method works optimally if the processing of a highly distorted rendition of an original sound file yields the identical or similar set of landmark and fingerprint pairs as was obtained for the original recording. The resulting index set for the sound sample is a set of pairs of analyzed values, (fingerprint, landmark), shown in FIG. 9A.

Given the pairs for the sound sample, the database index is searched to locate potentially matching files. Searching is carried out as follows: each (fingerprint$_k$, landmark$_k$) pair in the index set of the unknown sample is processed by searching for fingerprint$_k$ in the master index list. Fast searching algorithms on an ordered list are well known in the art and extensively discussed in D. E. Knuth, *The Art of Computer Programming, Volume 3: Sorting and Searching*, Reading, Mass.: Addison-Wesley, 1998.If fingerprint$_k$ is found in the master index list, then its corresponding list of matching (landmark*$_j$, sound_ID$_j$) pairs is copied and augmented with landmark$_k$ to form a set of triplets of the form (landmark$_k$, landmark*$_j$, sound_ID$_j$). In this notation, an asterisk (*) indicates a landmark of one of the indexed files in the database, while a landmark without an asterisk refers to the sample. In some cases, it is preferable that the matching fingerprints are not necessarily identical, but are similar; for example, they may differ by within a previously determined threshold. Matching fingerprints, whether identical or similar, are referred to as equivalent. The sound_ID$_j$ in the triplet corresponds to the file having the asterisked landmark. Thus each triplet contains two distinct landmarks, one in the database index and one in the sample, at which equivalent fingerprints were computed. This process is repeated for all k ranging over the input sample index set. All resulting triplets are collected into a large candidate list, illustrated in FIG. 9B. The candidate list is so called because it contains the sound_IDs of sound files that, by virtue of their matching fingerprints, are candidates for identification with the exogenous sound sample.

After the candidate list is compiled, it is further processed by segmenting according to sound_ID. A convenient way of doing this is to sort the candidate list by sound_ID or to insert it into a B-tree. A large number of sorting algorithms are available in the art, as discussed above. The result of this process is a list of candidate sound_IDs, each of which has a scatter list of pairs of sample and file landmark timepoints with the sound_ID optionally stripped off, (landmark$_k$, landmark*$_j$), as shown in FIG. 9C. Each scatter list thus contains a set of corresponding landmarks, corresponding by virtue of their being characterized by equivalent fingerprint value.

The scatter list for each candidate sound_ID is then analyzed to determine whether the sound_ID is a match for the sample. An optional thresholding step can be used first to eliminate a potentially large number of candidates that have very small scatter lists. Clearly, candidates having only one entry in their scatter lists, i.e., only one fingerprint in common with the sample, do not match the sample. Any suitable threshold number greater than or equal to one can be used.

Once the final number of candidates is determined, the winning candidate is located. If the following algorithm does not locate a winning candidate, then a failure message is returned. A key insight into the matching process is that the time evolution in matching sounds must follow a linear correspondence, assuming that the timebases on both sides are steady. This is almost always true unless one of the sounds has been nonlinearly warped intentionally or subject to defective playback equipment such as a tape deck with a warbling speed problem. Thus, the correct landmark pairs (landmark$_n$, landmark*$_n$) in the scatter list of a given sound_ID must have a linear correspondence of the form $$\text{landmark*}_n = m*\text{landmark}_n + \text{offset},$$

where m is the slope, which should be near one; landmark$_n$ is the timepoint within the exogenous sample; landmark*$_n$ is the corresponding timepoint within the sound recording indexed by sound_ID; and offset is the time offset into the sound recording corresponding to the beginning of the exogenous sound sample. Landmark pairs that can be fit with the above equation for particular values of m and offset are said to be linearly related. Obviously, the concept of being linearly related is only valid for more than one pair of corresponding landmarks. Note that this linear relationship identifies the correct sound file with high probability, while excluding outlying landmark pairs that have no significance. While it is possible for two distinct signals to contain a number of identical fingerprints, it is very unlikely that these fingerprints have the same relative time evolutions. The requirement for linear correspondences is a key feature of the present invention, and provides significantly better recognition than techniques that simply count the total number of features in common or measure the similarity between features. In fact, because of this aspect of the invention, sounds can be recognized even if fewer than 1% of the original recording's fingerprints appear in the exogenous sound sample, i.e., if the sound sample is very short or if it is significantly distorted.

Figure 10A:
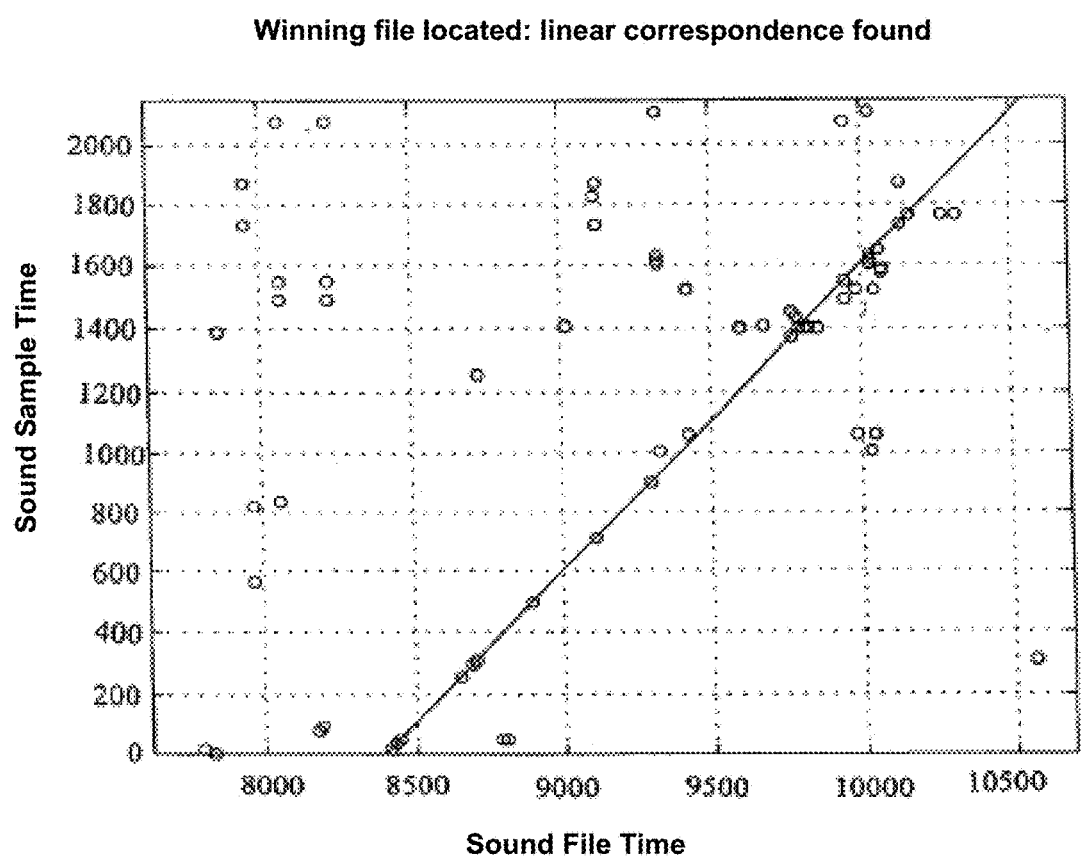
FIGS. 10A-10B are example scatter plots illustrating correct identification and lack of identification, respectively, of an unknown sound sample.
Figure 10B:
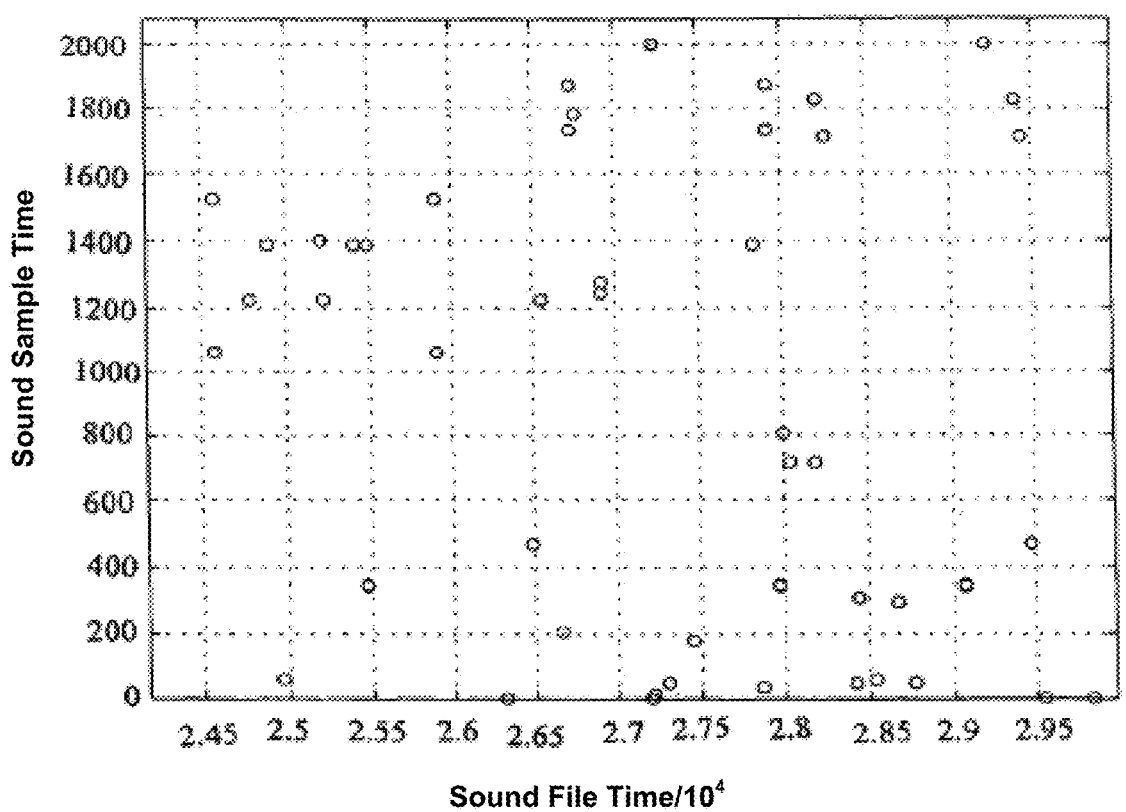

The problem of determining whether there is a match for the exogenous sample is thus reduced to the equivalent of finding a diagonal line with slope near one within a scatter plot of the landmark points of a given scatter list. Two sample scatter plots are shown in FIGS. 10A and 10B, with sound file landmarks on the horizontal axis and exogenous sound sample landmarks on the vertical axis. In FIG. 10A, a diagonal line of slope approximately equal to one is identified, indicating that the song indeed matches the sample, i.e., that the sound file is a winning file. The intercept at the horizontal axis indicates the offset into the audio file at which the sample begins. No statistically significant diagonal line is found in the scatter plot of FIG. 10B, indicating that the sound file is not a match for the exogenous sample.

There are many ways of finding a diagonal line in a scatter plot, all of which are within the scope of the present invention. It is to be understood that the phrase "locating a diagonal line" refers to all methods that are equivalent to locating a diagonal line without explicitly producing a diagonal line. A preferred method starts by subtracting $m*\text{landmark}_n$ from both sides of the above equation to yield $$(\text{landmark*}_n - m*\text{landmark}_n) = \text{offset}.$$

Assuming that m is approximately equal to one, i.e., assuming no time stretching, we arrive at $$(\text{landmark*}_n, \text{landmark}_n) = \text{offset}.$$

The diagonal-finding problem is then reduced to finding multiple landmark pairs for a given sound_ID that cluster near the same offset value. This can be accomplished easily by subtracting one landmark from the other and collecting a histogram of the resulting offset values. The histogram can be prepared by sorting the resulting offset values using a fast sort algorithm or by creating bin entries with counters and inserting into a B-tree. The winning offset bin in the histogram contains the highest number of points. This bin is referred to herein as the peak of the histogram. Since the offset must be positive if the exogenous sound signal is fully contained within the correct library sound file, landmark pairs that result in a negative offset can be excluded. Similarly, offsets beyond the end of the file can also be excluded. The number of points in the winning offset bin of the histogram is noted for each qualifying sound_ID. This number becomes the score for each sound recording. The sound recording in the candidate list with the highest score is chosen as the winner. The winning sound_ID is reported to a user as described below to signal the success of the identification. To prevent false identification, a minimum threshold score can be used to gate the success of the identification process. If no library sound has a score exceeding the threshold, then there is no recognition, and the user is so informed.

If the exogenous sound signal contains multiple sounds, then each individual sound can be recognized. In this case, multiple winners are located in the alignment scan. It is not necessary to know that the sound signal contains multiple winners, because the alignment scan will locate more than one sound_ID with a score that is much higher than the remaining scores. The fingerprinting method used preferably exhibits good linear superposition, so that the individual fingerprints can be extracted. For example, a spectrogram fingerprinting method exhibits linear superposition.

If the sound sample has been subjected to time stretching, then the slope is not identically equal to one. The result of assuming a unity slope on a time stretched sample (assuming that the fingerprints are time stretch invariant) is that the computed offset values are not equal. One way to address this and to accommodate moderate time stretching is to increase the size of the offset bins, i.e., to consider a range of offsets to be equal. In general, if the points do not fall on a straight line, then the computed offset values are significantly different, and a slight increase in the size of the offset bins does not yield a significant number of false positives.

Other line-finding strategies are possible. For example, a Radon or Hough transform, described in T. Risse, "Hough Transform for Line Recognition," *Computer Vision and Image Processing*, 46, 327-345, 1989, which are well known in the arts of machine vision and graphics research, may be used. In the Hough transform, each point of the scatter plot projects to a line in (slope, offset) space. The set of points in the scatter plot are thus projected onto the dual space of lines in the Hough transform. Peaks in the Hough transform correspond to intersections of the parameter lines. The global peak of such a transform of a given scatter plot indicates the most number of intersecting lines in the Hough transform, and thus the most number of co-linear points. To allow a speed variation of 5%, for example, the construction of the Hough transform can be restricted to the region where the slope parameter varies between 0.95 and 1.05, thus saving some computational effort.

Hierarchical Search

In addition to the thresholding step that eliminates candidates with very small scatter lists, further improvements in efficiency can be made. In one such improvement, the database index is segmented into at least two parts according to probability of occurrence, and only the sound files with the highest probability of matching the sample are initially searched. The division can occur at various stages of the process. For example, the master index list (FIG. 8C) can be segmented into two or more parts such that steps 16 and 20 are first performed on one of the segments. That is, files corresponding to matching fingerprints are retrieved from only a fraction of the database index, and a scatter list is generated from this fraction. If a winning sound file is not located, then the process is repeated on the remainder of the database index. In another implementation, all files are retrieved from the database index, but the diagonal line scan is performed separately on the different segments.

Using this technique, the diagonal line scan, a computationally intensive part of the method, is performed first on a small subset of the sound files in the database index. Because the diagonal line scan has a time component that is approximately linear with respect to the number of sound files being scanned, performing such a hierarchical search is highly advantageous. For example, assume that the sound database index contains fingerprints representing 1,000,000 sound files, but that only about 1000 files match the sample queries with high frequency, e.g., 95% of the queries are for 1000 files, while only 5% of the queries are for the remaining 999,000 files. Assuming a linear dependence of computational cost on the number of files, the cost is proportional to 1000 95% of the time and proportional to 999,000 only 5% of the time. The average cost is therefore proportional to about 50,900. A hierarchical search thus yields about a factor of 20 savings in computational load. Of course, the database index can be segmented into more than two levels of hierarchy, e.g., a group of new releases, a group of recently released songs, and a group of older, less popular songs.

As described above, the search is first performed on a first subset of sound files, the high-probability files, and then, only if the first search fails, performed on a second subset containing the remaining files. Failure of the diagonal line scan occurs if the number of points in each offset bin does not reach a predetermined threshold value. Alternatively, the two searches can be carried out in parallel (simultaneously). If the correct sound file is located in a search of the first subset, then a signal is sent to terminate the search of the second subset. If the correct sound file is not located in the first search, then the second search continues until a winning file is located. These two different implementations involve tradeoffs in computational effort and time. The first implementation is more computationally efficient, but introduces a slight latency if the first search fails, while the second implementation wastes computational effort if the winning file is in the first subset but minimizes latency if it is not.

The object of segmenting the list is to estimate the probability that a sound file is the target of a query and to limit the search to those files most likely to match the query sample. There are various possible ways of assigning probabilities and sorting the sounds in the database, all of which are within the scope of the present invention. Preferably, probabilities are assigned based on recency or frequency of being identified as the winning sound file. Recency is a useful measure, particularly for popular songs, because musical interests change quite rapidly over time as new songs are released. After the probability scores are computed, rankings are assigned to the files, and the list self-sorts by the ranking. The sorted list is then segmented into two or more subsets for searching. The smaller subset can contain a predetermined number of files. For example, if the ranking locates a file within the top, say, 1000 files, then the file is placed in the smaller, faster search. Alternatively, the cut-off points for the two subsets can be adjusted dynamically. For example, all files with a score exceeding a particular threshold value can be placed within the first subset, and so the number of files in each subset changes continually.

One particular way of computing the probability is to increment a sound file's score by one each time it is identified as a match for the query sample. To take recency into account, all of the scores are reduced downward periodically, so that newer queries have a stronger effect on the ranking than do older queries. For example, all scores can be ratcheted downward by a constant multiplicative factor upon each query, resulting in an exponential decay of the score if not updated. Depending upon the number of files in the database, which can easily be one million, this method can require updating a large number of scores at every query, making it potentially undesirable. Alternatively, the scores can be adjusted downward at relatively infrequent intervals, such as once per day. The ordering resulting from less frequent adjustment is effectively similar, but not quite identical, to the ordering resulting from adjustment with each query. However, the computational load to update the rankings is much lower.

A slight variation of this recency adjustment, which more exactly preserves the recency score, is to add an exponentially growing score update $a^t$ to the winning sound file upon query, where t is the amount of time elapsed since the last global update. All scores are then adjusted downward by dividing by $a^T$ at each global update, where T is the total elapsed time since the last global update. In this variation, a is a recency factor that is greater than one.

In addition to the ranking described above, some a priori knowledge can be introduced to help seed the listing. For example, new releases are likely to have higher numbers of queries than older songs. Thus, new releases can be placed automatically in the first subset containing songs with a higher probability of matching queries. This can be performed independently of the self-ranking algorithm described above. If the self-ranking feature is also used, new releases can be assigned initial rankings that place them somewhere within the first subset. The new releases can be seeded at the very top of the list, at the bottom of the list of high probability songs, or somewhere in between. For the purposes of the search, the initial location does not matter, because the ranking converges over time to reflect the true level of interest.

In an alternative embodiment, the search is performed in the order of the recency rankings and is terminated when a sound_ID score exceeds a predetermined threshold value. This is equivalent to the above method in which each segment contains one sound_ID only. Experiments show that the score of a winning sound is much higher than scores of all other sound files, and so a suitable threshold can be chosen with minimal experimentation. One way to implement this embodiment is to rank all sound_IDs in the database index according to recency, with arbitrary tie-breaking in the case of identical scores. Because each recency ranking is unique, there is a one-to-one mapping between the recency score and the sound_ID. The ranking can then be used instead of the sound_ID when sorting by sound_ID to form the list of candidate Sound_IDs and associated scatter lists (FIG. 9C). The ranking numbers can be bound to the index when the index list of triplets (fingerprint, landmark, sound_ID) is generated and before the index list is sorted into the master index list. The ranking then takes the place of the sound_ID. Alternatively, a search and replace function can be used to replace the sound_ID with the ranking. As rankings are updated, new rankings are mapped onto the old rankings, provided that the mapping integrity is maintained.

Alternatively, the rankings can be bound later in the process. Once the scatter lists are created, a ranking can be associated with each sound_ID. The sets are then sorted by ranking. In this implementation, only the pointers to the scatter lists need to be modified; the grouping into scatter lists does not need to be repeated. The advantage of later bindings is that the entire database index does not need to be recreated each time the rankings are updated.

Note that the popularity ranking may itself be of interest as an object of economic value. That is, the ranking reflects the desirability of consumers to obtain an identification of an unknown sound sample. In many cases, the query is prompted by a desire to purchase a recording of the song. In fact, if demographic information about the user is known, then alternative ranking schemes can be implemented for each desired demographic group. A user's demographic group can be obtained from profile information requested when the user signs up for the recognition service. It can also be determined dynamically by standard collaborative filtering techniques.

In a real-time system, the sound is provided to the recognition system incrementally over time, enabling pipelined recognition. In this case, it is possible to process the incoming data in segments and to update the sample index set incrementally. After each update period, the newly augmented index set is used to retrieve candidate library sound recordings using the searching and scanning steps above. The database index is searched for fingerprints matching newly obtained sample fingerprints, and new (landmark$_k$, landmark*$_j$, sound_ID$_j$) triplets are generated. New pairs are added to the scatter lists, and the histograms are augmented. The advantage of this approach is that if sufficient data has been collected to identify the sound recording unambiguously, e.g., if the number of points in an offset bin of one of the sound files exceeds a high threshold or exceeds the next highest sound file score, then data acquisition can be terminated and the result announced.

Once the correct sound has been identified, the result is reported to a user or system by any suitable method. For example, the result can be reported by a computer printout, email, web search result page, SMS (short messaging service) text messaging to a mobile phone, computer-generated voice annotation over a telephone, or posting of the result to a web site or Internet account that the user can access later. The reported results can include identifying information of the sound such as the name and artist of a song; the composer, name, and recording attributes (e.g., performers, conductor, venue) of a classical piece; the company and product of an advertisement; or any other suitable identifiers. Additionally, biographical information, information about concerts in the vicinity, and other information of interest to fans can be provided; hyperlinks to such data may be provided. Reported results can also include the absolute score of the sound file or its score in comparison to the next highest scored file.

One useful outcome of the recognition method is that it does not confuse two different renditions of the same sound. For example, different performances of the same piece of classical music are not considered to be the same, even if a human cannot detect a difference between the two. This is because it is highly unlikely that the landmark/fingerprint pairs and their time evolution exactly match for two different performances. In a current embodiment, the landmark/fingerprint pairs must be within about 10 ms of one another for a linear correspondence to be identified. As a result, the automatic recognition performed by the present invention makes it possible for the proper performance/soundtrack and artist/label to be credited in all cases.

Example Implementation

A preferred implementation of the invention, continuous sliding window audio recognition, is described below. A microphone or other source of sound is continually sampled into a buffer to obtain a record of the previous N seconds of sound. The contents of the sound buffer are periodically analyzed to ascertain the identity of the sound content. The sound buffer can have a fixed size or it can grow in size as the sound is sampled, referred to herein as sequentially growing segments of the audio sample. A report is made to indicate the presence of identified sound recordings. For example, a log file can be collected, or a display can be shown on a device indicating information about the music, such as title, artist, album cover art, lyrics, or purchase information. To avoid redundancy, a report can be made only when the identity of recognized sound changes, for example, after a program change on a jukebox. Such a device can be used to create a list of music played from any sound stream (radio, interne streaming radio, hidden microphone, telephone call, etc.). In addition to the music identity, information such as the time of recognition can be logged. If location information is available (e.g., from GPS), such information can also be logged.

To accomplish the identification, each buffer can be identified de novo. Alternatively, sound parameters can be extracted, for example, into fingerprints or other intermediate feature-extracted forms, and stored in a second buffer. New fingerprints can be added to the front of the second buffer, with old fingerprints being discarded from the end of the buffer. The advantage of such a rolling buffer scheme is that the same analysis does not need to be performed redundantly on old overlapping segments of sound samples, thus saving computational effort. The identification process is periodically carried out on the contents of the rolling fingerprint buffer. In the case of a small portable device, the fingerprint analysis can be carried out in the device and the results transmitted to a recognition server using a relatively low-bandwidth data channel, since the fingerprint stream is not very data-intensive. The rolling fingerprint buffer may be held on the portable device and transferred to the recognition server each time, or it may be held at the recognition server, in which case a continuing recognition session is cached on the server.

In such a rolling buffer recognition system, new sound recordings can be recognized as soon as sufficient information is available for recognition. Sufficient information may take up less than the length of the buffer. For example, if a distinctive song can be recognized uniquely after one second of play, and the system has a one-second recognition periodicity, then the song can be recognized immediately, although the buffer may have a 15-30 second length. Conversely, if a less distinctive song requires more seconds of sample to recognize, the system must wait a longer period before declaring the identity of the song. In this sliding window recognition scheme, sounds are recognized as soon as they can be identified.

It is important to note that while the present invention has been described in the context of a fully functional recognition system and method, those skilled in the art will appreciate that the mechanism of the present invention is capable of being distributed in the form of a computer-readable medium of instructions in a variety of forms, and that the present invention applies equally regardless of the particular type of signal bearing media used to actually carry out the distribution. Examples of such computer-accessible devices include computer memory (RAM or ROM), floppy disks, and CD-ROMs, as well as transmission-type media such as digital and analog communication links.

It will be clear to one skilled in the art that the above embodiments may be altered in many ways without departing from the scope of the invention. Accordingly, the scope of the invention should be determined by the following claims and their legal equivalents.

What is claimed is:

1. A method performed by a computing device, the method comprising:
   receiving a media sample;
   converting, by a computing device, the media sample into frequency transform frames at periodic time intervals;
   determining, by the computing device, an energy density representation of the frequency transform frames;
   determining, by the computing device, time-frequency coordinates corresponding to local maxima of the energy density representation;
   generating, by the computing device, fingerprints of the media sample based on determined time-frequency coordinates of the energy density representation; and
   performing a content identification of the media sample using the fingerprint by comparing the fingerprint to stored fingerprints in memory of a database index.

2. The method of claim 1, wherein receiving the media sample
   comprises:
   receiving the media sample from a client device that has recorded the media sample by use of a microphone.

3. The method of claim 1, wherein converting the media sample into frequency transform frames at periodic time intervals comprises:
   converting the media sample into frequency transform frames using a Fast Fourier Transform (FFT).

4. The method of claim 1, wherein converting the media sample into frequency transform frames at periodic time intervals comprises:
   using a sampling rate of 8000 Hz and an FFT frame size of 1024 samples.

5. The method of claim 1, wherein determining the energy density representation of the frequency transform frames comprises:
   determining a spectrogram plot depicting energy density at each time-frequency point for the frequency transform frames.

6. The method of claim 1, further comprising:
   determining landmarks corresponding to the fingerprints, wherein the landmarks correspond to respective times of the time-frequency coordinates.

7. The method of claim 1, wherein generating the fingerprints of the media sample based on determined time-frequency coordinates of the energy density representation comprises:
   generating fingerprints of the media sample for content identification that are invariant with respect to time stretching of the media sample.

8. The method of claim 7, wherein generating the fingerprint of the media sample for content identification that is invariant with respect to time stretching of the media sample comprises:
   generating the fingerprint based on ratios of frequencies of spectrogram peaks of the media sample.

9. The method of claim 1, wherein determining the energy density representation of the frequency transform frames comprises determining windowed and overlapped frames of the media sample using a Fast Fourier Transform (FFT).

10. The method of claim 1, wherein determining the energy density representation of the frequency transform frames comprises determining a spectrogram of the media sample.

11. A system, comprising:
    a computing device; and
    a memory, the memory configured to store instructions that when executed by the computing device cause the system to perform functions comprising:
    receiving a media sample;
    converting, by the computing device, the media sample into frequency transform frames at periodic time intervals;
    determining, by the computing device, an energy density representation of the frequency transform frames;
    determining, by the computing device, time-frequency coordinates corresponding to local maxima of the energy density representation;
    generating, by the computing device, fingerprints of the media sample based on determined time-frequency coordinates of the energy density representation; and
    performing a content identification of the media sample using the fingerprint by comparing the fingerprint to stored fingerprints in memory of a database index.

12. The system of claim 11, wherein receiving the media sample
    comprises:
    receiving the media sample from a client device that has recorded the media sample by use of a microphone.

13. The system of claim 11, wherein determining the energy density representation of the frequency transform frames comprises:
    determining a spectrogram plot depicting energy density at each time-frequency point for the frequency transform frames.

14. The system of claim 11, wherein the memory is further configured to store instructions that when executed by the computing device cause the system to perform functions comprising:
    determining landmarks corresponding to the fingerprints, wherein the landmarks correspond to respective times of the time-frequency coordinates.

15. The system of claim 11, wherein generating the fingerprints of the media sample based on determined time-frequency coordinates of the energy density representation comprises:
    generating fingerprints of the media sample for content identification that are invariant with respect to time stretching of the media sample.

16. A non-transitory computer readable medium having stored there instructions, that when executed by a computing device, cause the computing device to perform functions comprising:
    receiving a media sample;
    converting, by the computing device, the media sample into frequency transform frames at periodic time intervals;

determining, by the computing device, an energy density representation of the frequency transform frames;

determining, by the computing device, time-frequency coordinates corresponding to local maxima of the energy density representation; and generating, by the computing device, fingerprints of the media sample based on determined time-frequency coordinates of the energy density representation.

17. The non-transitory computer readable medium of claim 16, further comprising instructions, that when executed by a computing device, cause the computing device to perform functions comprising:

determining landmarks corresponding to the fingerprints, wherein the landmarks correspond to respective times of the time-frequency coordinates.

18. The non-transitory computer readable medium of claim 16, wherein generating the fingerprints of the media sample based on determined time-frequency coordinates of the energy density representation comprises:

generating fingerprints of the media sample for content identification that are invariant with respect to time stretching of the media sample.

\* \* \* \* \*